US010448053B2

(12) United States Patent
Said et al.

(10) Patent No.: US 10,448,053 B2
(45) Date of Patent: Oct. 15, 2019

(54) MULTI-PASS NON-SEPARABLE TRANSFORMS FOR VIDEO CODING

(71) Applicant: QUALCOMM Incorporated, San Diego, CA (US)

(72) Inventors: Amir Said, San Diego, CA (US); Xin Zhao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 15/432,500

(22) Filed: Feb. 14, 2017

(65) Prior Publication Data
US 2017/0238013 A1    Aug. 17, 2017

Related U.S. Application Data

(60) Provisional application No. 62/295,448, filed on Feb. 15, 2016, provisional application No. 62/295,440, filed on Feb. 15, 2016.

(51) Int. Cl.
*H04N 19/00* (2014.01)
*H04N 19/61* (2014.01)
(Continued)

(52) U.S. Cl.
CPC ............. *H04N 19/61* (2014.11); *H04N 19/42* (2014.11); *H04N 19/60* (2014.11); *H04N 19/70* (2014.11);
(Continued)

(58) Field of Classification Search
CPC .. H04N 7/50; H04N 7/26244; H04N 7/26271; H04N 7/26015; H04N 7/26031
See application file for complete search history.

(56) References Cited

U.S. PATENT DOCUMENTS 7,502,743 B2 *   3/2009   Thumpudi ............ G10L 19/008
                                                                 704/500
8,321,207 B2 *  11/2012   Edler .................... G10L 19/26
                                                                 704/203
(Continued)

FOREIGN PATENT DOCUMENTS

CN        102811111 A    12/2012

OTHER PUBLICATIONS

Chen H., et al., "New Transforms Tightly Bounded by DCT and KLT," IEEE Signal Processing Letters, vol. 19, No. 6, Jun. 1, 2012, pp. 344-347.
(Continued)

*Primary Examiner* — Frank F Huang
(74) *Attorney, Agent, or Firm* — Shumaker & Sieffert, P.A.

(57) ABSTRACT

An example method of decoding video data includes determining, by a video decoder and based on syntax elements in an encoded video bitstream, a plurality of values for a current block of the video data; performing, by the video decoder, a multi-pass non-separable inverse transformation on the plurality of values to derive residual data that represents pixel differences between the current block of the video data and a predictive block of the video data; and reconstructing, by the video decoder, the current block of the video data based on the residual data and the predictive block of the video data. In some examples, performing a pass of the multi-pass non-separable inverse transformation includes performing a plurality of Givens orthogonal transformations.

18 Claims, 15 Drawing Sheets

(51) Int. Cl.
| | |
|---|---|
| *H04N 19/70* | (2014.01) |
| *H04N 19/60* | (2014.01) |
| *H04N 19/42* | (2014.01) |
| *H04N 19/176* | (2014.01) |
| *H04N 19/182* | (2014.01) |
| *H04N 19/184* | (2014.01) |

(52) U.S. Cl.
CPC .......... *H04N 19/176* (2014.11); *H04N 19/182* (2014.11); *H04N 19/184* (2014.11)

(56) References Cited

U.S. PATENT DOCUMENTS

| | | | |
|---|---|---|---|
| 9,271,221 | B2* | 2/2016 | Tong .................. H04B 7/0617 |
| 2006/0010188 | A1 | 1/2006 | Solomon et al. |
| 2012/0008675 | A1 | 1/2012 | Karczewicz et al. |
| 2013/0114669 | A1 | 5/2013 | Karczewicz et al. |
| 2017/0238014 | A1 | 8/2017 | Said et al. |
| 2017/0238019 | A1 | 8/2017 | Said et al. |

OTHER PUBLICATIONS

Cintra R.J., et al., "Energy-Efficient 8-Point DCT Approximations: Theory and Hardware Architectures," Circuits, Systems and Signal Processing, vol. 35, No. 11, Dec. 30, 2015, pp. 4009-4029.
International Search Report and Written Opinion of International Application No. PCT/US2017/017933, dated Apr. 12, 2017, 16 pp.
Mandyam G., et al., "Lossless Image Compression Using the Discrete Cosine Transform," Journal of Visual Communication and Image Representation, vol. 8, No. 1, Mar. 1, 1997, retrieved on Mar. 6, 1995, pp. 21-26.
Parfieniuk M., "Using the CS Decomposition to Compute the 8-Point DCT," IEEE International Symposium on Circuits and Systems (ISCAS), May 1, 2015, pp. 2836-2839.
Zhu S., et al., "In Search of "Better-than-DCT" Unitary Transforms for Encoding of Residual Signals," IEEE Signal Processing Letters, vol. 17, No. 11, Nov. 1, 2010, pp. 961-964.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T Rec. H.261 (Dec. 1990), "Line Transmission on Non-Telephone Signals, Video Codec for Audiovisual Services AT p x 64 kbit/s", Dec. 1990, 32 pp.
ITU-T H.263, Series H: Audiovisual and Multimedia Systems, Infrastructure of audiovisual services—Coding of moving video, Video coding for low bit rate communication, Jan. 2005, 226 pp.
ITU-T Rec. H.262 (Jul. 1995), "Transmission on Non-Telephone Signals, Information Technology—Generic Coding of Moving Pictures and Associated Audio Information: Video", Jul. 1995, 211 pp.
ITU-T H.264, Series H: Audiovisual and Multimedia Systems, Infrastructure of audiovisual services-13 Coding of moving video, Advanced video coding for generic audiovisual services, The International Telecommunication Union. Jun. 2011, 674 pp.
Sullivan G., Overview of the High Efficiency Video Coding (HEVC) Standard, IEEE Transactions on Circuits and Systems for Video Technology, vol. 22, No. 12, pp. 1649-1668, Dec. 2012.
Ye Y., Improved H.264 Intra Coding Based on Bi-Directional Intra Prediction, Directional Transform, and Adaptive Coefficient Scanning, in Proc. IEEE Int. Conf. Image Process., San Diego, CA, Oct. 2008, pp. 2116-2119.

Wien M., "High Efficiency Video Coding", Coding Tools and Specification, Springer-Verlag, Berlin, 2015, 30 pp.
Said A., "Highly Efficient Non-Separable Transforms for Next Generation Video Coding", 2016 Picture Coding Symposium (PCS) : Nuremberg, Germany, Dec. 4-7, 2016; IEEE, pp. 1-5.
Zhao X., EE1: Improvements on non-separable secondary transform, Joint Video Exploration Team (JVET) of ITU-T SG16 WP3 and ISO/IEC JTC1/SC29/WG11 4th Meeting: Chengdu, CN, JVET-D0120, Oct. 15-21, 2016, 5 pp.
Britanak V., et al., "Discrete Cosine and Sine Transforms", General Properties, Fast Algorithms and Integer Approximations, Academic Press, Apr. 2007, pp. 16-38.
Zhao X., et al., "TU-level non-separable secondary transform", Joint Video Exploration Team (JVET) of ITU-T SG16 WP3 and ISO/IEC JTC1/SC29/WG11 2nd Meeting: San Diego, USA, Feb. 20-26, 2016, JVET-B0059, 5 pp.
Zhao X., et al., "EE2.7: TU-level non-separable secondary transform", Joint Video Exploration Team (JVET) of ITU-T SG16 WP3 and ISO/IEC JTC1/SC29/WG11 3rd Meeting: Geneva, CH, May 26-Jun. 1, 2016, JVET-C0053_v3, 10 pp.
Takamura S., et al., "On Intra Coding Using Mode Dependent 2D-KLT", in Proc 30th Picture Coding Symp, San Jose CA, Dec. 2013, pp. 137-140.
Sezer, O.G., et al., "Approximation and Compression with Sparse Orthonormal Transforms", IEEE Transactions on Image Processing, vol. 24, No. 8, Aug. 2015, pp. 2328-2343.
Egilmez, H., et al., "Graph-Based Transforms for Inter Predicted Video Coding" in Proc IEEE int. Conf. Image Process., Quebec City, Canada, Sep. 2015, pp. 3992-3996.
Doganata, Z., et al., "General Synthesis Procedures for FIR Lossless Transfer Matrices, for Perfect-Reconstruction Multirate Filter Bank Applications", IEEE Transactions on Acoustics, Speech, and Signal Processing, vol. 36, No. 10, Oct. 1988, pp. 1561-1574.
P.P Vaidyanathan., "14.6.1 Factorization of Real Unitary Matrices Using Givens Rotations," Chapter 14, Multirate Systems and Filter Banks, Prentice Hall Signal Processing Series, 1993, pp. 747-750.
Alshina E., et al., "Description of Exploration Experiments on Coding Tools", Joint Video Exploration Team (JVET) of ITU-T SG16 WP3 and ISO/IEC JTC1/SC29/WG11 2nd Meeting: San Diego, USA, Feb. 20-26, 2016, JVET-B1011, Feb. 26, 2016, 5 pp.
Huang H., et al., "EE2.1: Quadtree plus binary tree structure integration with JEM tools", Joint Video Exploration Team (JVET) of ITU-T SG16 WP3 and ISO/IEC JTC1/SC29/WG11 3rd Meeting: Geneva, CH, May 26-Jun. 1, 2016, JVET-C0024, May 16, 2016, 5 pp.
Suehring, K., et al., "JVET common test conditions and software reference configurations", Joint Video Exploration Team (JVET) of ITU-T SG16 WP3 and ISO/IEC JTC1/SC29/WG11 2nd Meeting: San Diego, USA Feb. 20-26, 2017, JVET-B1010, Apr. 4, 2016, 4 pp.
Zhao X., et al., "EE2.7 related: Improved non-separable secondary transform", Joint Video Exploration Team (JVET) of ITU-T SG16 WP3 and ISO/IEC JTC1/SC29/WG11 3rd Meeting: Geneva, CH, May 26-Jun. 1, 2016, JVET-C0063, May 17, 2016, 3 pp.
Alshina E., et al., "Description of Exploration Experiments on Coding Tools", Joint Video Exploration Team (JVET) of ITU-T SG16 WP3 and ISO/IEC JTC1/SC29/WG11 3rd Meeting: Geneva, CH, May 26-31, 2016, JVET-C1011, May 31, 2016, 9 pp.
International Preliminary Report on Patentability from International Application No. PCT/US2017/017933, dated May 23, 2018, 22 pp.
Reply to Written Opinion from corresponding PCT Application Serial No. PCT/US2017/017933 filed on Dec. 15, 2017 (29 pages).
Second Written Opinion from corresponding PCT Application Serial No. PCT/US2017/017933 dated Jan. 23, 2018 (8 pp).

* cited by examiner

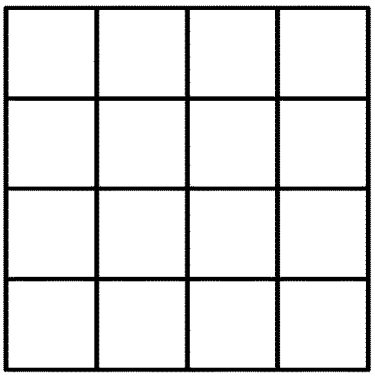
FIG. 3A
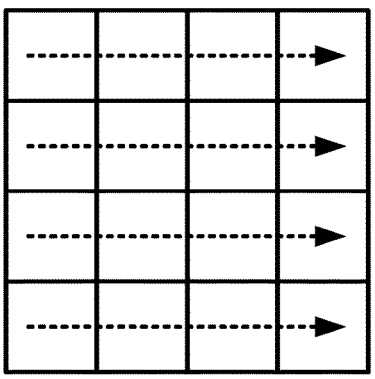
FIG. 3B
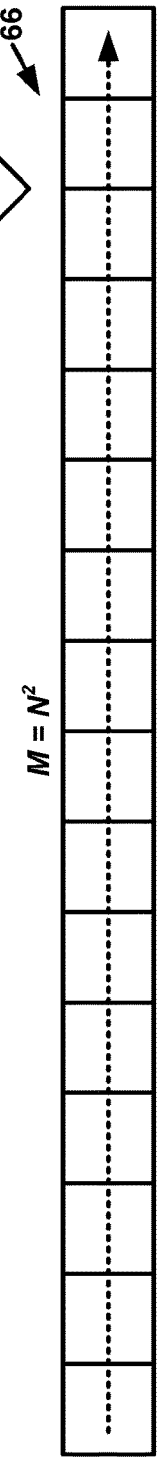

MULTI-PASS NON-SEPARABLE TRANSFORMS FOR VIDEO CODING

This application claims the benefit of U.S. Provisional Patent Application 62/295,440, filed Feb. 15, 2016 and U.S. Provisional Patent Application 62/295,448, filed Feb. 15, 2016, the entire contents of which are incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

In general, the disclosure describes techniques for transform coding using Compact Multi-Pass Transforms (CMPTs). Transform coding is a part of video coding, such as in the latest standard, High-Efficiency Video Coding (HEVC). HEVC may use block transforms that are separable (e.g., horizontal transform and then vertical transform, or vice-versa) and fixed per block size, thus using little memory for implementation.

It may be possible to improve compression using a plurality of sets of non-separable transforms, with compression improvements dependent on the number of available transforms. Having many sets of non-separable transforms may result in having to use too much expensive fast memory to store the parameters defining all those transforms in matrix format. This disclosure describes example techniques that may replace matrix-based transforms. Rather than using matrix-based transforms, this disclosure uses one or more CMPTs, which can, in general terms, use less memory and computation as compared to transforms in matrix format.

In one example, a method of decoding video data includes determining, by a video decoder and based on syntax elements in an encoded video bitstream, a plurality of values for a current block of the video data; performing, by the video decoder, a multi-pass non-separable inverse transformation on the plurality of values to derive residual data that represents pixel differences between the current block of the video data and a predictive block of the video data, wherein performing a pass of the multi-pass non-separable inverse transformation comprises performing a plurality of Givens orthogonal transformations; and reconstructing, by the video decoder, the current block of the video data based on the residual data and the predictive block of the video data.

In another example, a device for decoding video data includes a memory configured to store the video data; and one or more processors. In the example, the one or more processors are configured to: determine, based on syntax elements in an encoded video bitstream, a plurality of values for a current block of the video data; perform a multi-pass non-separable inverse transformation on the plurality of values to derive residual data that represents pixel differences between the current block of the video data and a predictive block of the video data, wherein performing a pass of the multi-pass non-separable inverse transformation comprises performing a plurality of Givens orthogonal transformations; and reconstruct the current block of the video data based on the residual data and the predictive block of the video data.

In another example, a device for decoding video data includes means for determining, based on syntax elements in an encoded video bitstream, a plurality of values for a current block of the video data; means for performing a multi-pass non-separable inverse transformation on the plurality of values to derive residual data that represents pixel differences between the current block of the video data and a predictive block of the video data, wherein performing a pass of the multi-pass non-separable inverse transformation comprises performing a plurality of Givens orthogonal transformations; and means for reconstructing the current block of the video data based on the residual data and the predictive block of the video data.

In another example, a computer-readable storage medium stores instructions that, when executed, cause one or more processors of a video decoder to determine, based on syntax elements in an encoded video bitstream, a plurality of values for a current block of the video data; perform a multi-pass non-separable inverse transformation on the plurality of values to derive residual data that represents pixel differences between the current block of the video data and a predictive block of the video data, wherein performing a pass of the multi-pass non-separable inverse transformation comprises performing a plurality of Givens orthogonal transformations; and reconstruct the current block of the video data based on the residual data and the predictive block of the video data.

In another example, a method of encoding video data includes determining, for a current block of the video data, residual data that represents pixel differences between the current block of the video data and a predictive block of the video data; performing a multi-pass non-separable transformation on the residual data to generate a plurality of values, wherein performing a pass of the multi-pass non-separable inverse transformation comprises performing a plurality of Givens orthogonal transformations; and encoding, in an encoded video bitstream, syntax elements that represent the plurality of values.

In another example, a device for encoding video data includes a memory configured to store the video data; and one or more processors. In the example, the one or more processors are configured to: determine, for a current block of the video data, residual data that represents pixel differences between the current block of the video data and a predictive block of the video data; perform a multi-pass non-separable transformation on the residual data to generate a plurality of values, wherein performing a pass of the multi-pass non-separable inverse transformation comprises performing a plurality of Givens orthogonal transformations; and encode, in an encoded video bitstream, syntax elements that represent the plurality of values.

In another example, a device for encoding video data includes means for determining, for a current block of the video data, residual data that represents pixel differences between the current block of the video data and a predictive block of the video data; means for performing a multi-pass non-separable transformation on the residual data to generate a plurality of values, wherein performing a pass of the multi-pass non-separable inverse transformation comprises performing a plurality of Givens orthogonal transformations; and means for encoding, in an encoded video bitstream, syntax elements that represent the plurality of values.

In another example, a computer-readable storage medium stores instructions that, when executed, cause one or more processors of a video encoder to determine, for a current block of the video data, residual data that represents pixel differences between the current block of the video data and a predictive block of the video data; perform a multi-pass non-separable transformation on the residual data to generate a plurality of values, wherein performing a pass of the multi-pass non-separable inverse transformation comprises performing a plurality of Givens orthogonal transformations; and encode, in an encoded video bitstream, syntax elements that represent the plurality of values.

The details of one or more examples are set forth in the accompanying drawings and the description below. Other features, objects, and advantages will be apparent from the description, drawings, and claims.

BRIEF DESCRIPTION OF DRAWINGS

FIGS. 3A-3B illustrate example options for applying transforms to a two-dimensional block of video residuals.

DETAILED DESCRIPTION

This disclosure describes techniques that may solve problems with the advanced application of transform coding, which is a fundamental part of video compression standards. The techniques of this disclosure may reduce memory and computation for large numbers of non-separable transforms, potentially enabling large coding gains with reasonable costs. In the past, several data-adaptive transform techniques had been proposed for video coding, showing very significant coding gains, but with prohibitive complexity. In some instances, the techniques of this disclosure may reduce memory needed, potentially with very little performance loss.

Figure 1:
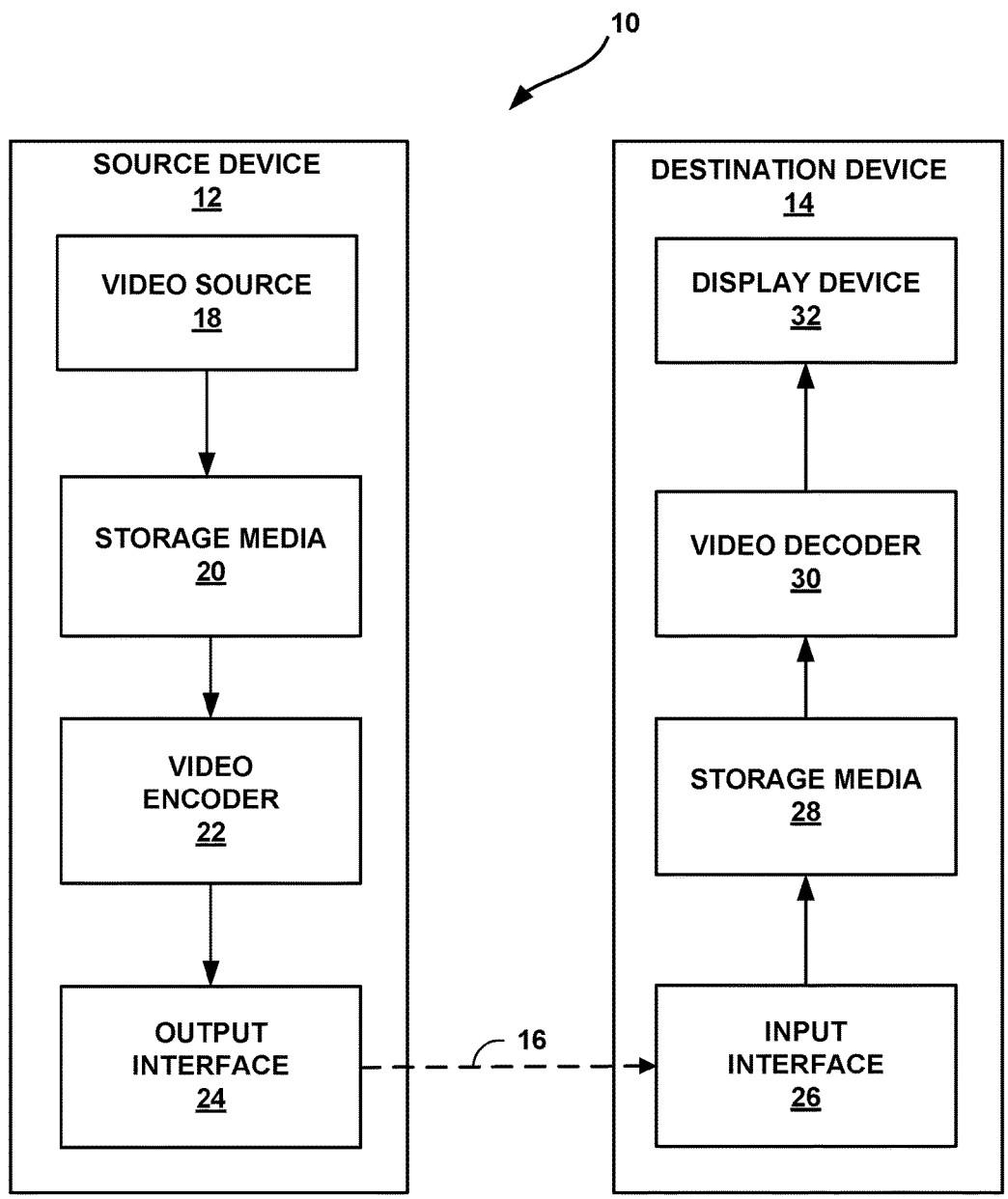
FIG. 1 is a block diagram illustrating an example video encoding and decoding system configured to implement techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices.

Source device 12 is an example video encoding device (i.e., a device for encoding video data). Destination device 14 is an example video decoding device (i.e., a device for decoding video data).

In the example of FIG. 1, source device 12 includes a video source 18, a storage media 20 configured to store video data, a video encoder 22, and an output interface 24. Destination device 14 includes an input interface 26, a storage medium 28 configured to store encoded video data, a video decoder 30, and a display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 22 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 22 and video decoder 30 may be included in one or more encoders or decoders, either of which may be integrated as part of a combined encoder/decoder (CODEC) in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

To generate a coded CTU, video encoder 22 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 22 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU.

After video encoder 22 generates predictive blocks (e.g., luma, Cb, and Cr predictive blocks) for one or more PUs of a CU, video encoder 22 may generate one or more residual blocks for the CU. For instance, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. Each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 22 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms to a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

After generating a coefficient block (e.g., a luma coefficient block, a Cb coefficient block or a Cr coefficient block), video encoder 22 may quantize the coefficient block. Quantization generally refers to a process in which transform coefficients are quantized to possibly reduce the amount of data used to represent the transform coefficients, providing further compression. After video encoder 22 quantizes a coefficient block, video encoder 22 may entropy encode syntax elements indicating the quantized transform coefficients. For example, video encoder 22 may perform Context-Adaptive Binary Arithmetic Coding (CABAC) on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 22. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Transform coding is a fundamental part of all modern video coding standards, like High-Efficiency Video Coding (HEVC) (G. J. Sullivan, J.-R. Ohm, W.-J. Han, and T. Wiegand, "Overview of the High Efficiency Video Coding (HEVC) Standard," *IEEE Trans. Circuits Syst. Video Technol.*, vol. 22, no. 12, pp. 1649-1668, December 2012; M. Wien, *High Efficiency Video Coding: Coding Tools and Specification*, Springer-Verlag, Berlin, 2015). The most recent copy of the HEVC standard is entitled "ITU-T H.265, Series H: Audiovisual and Multimedia Systems, Infrastructure of audiovisual services—Coding of moving video, Advanced video coding for generic audiovisual services, The International Telecommunication Union. October 2014, 540 pp, and available at https://www.itu.int/rec/T-REC-H.265-201410-S/en. Optimal transform coding may employ the matrix-based Karhunen-Loève Transforms (KLTs) (or similarly adaptive transforms), since they can be optimized to particular signal statistics. However, matrix-based transform coding implementations, such as matrix-based KLTs, tend to require a relatively high number computations and a relatively high amount of memory. In practice, fixed separable transforms like the Discrete Cosine Transform (DCT) have been adopted as they may be use fewer computations and memory to implement the transform than matrix-based implementations.

This disclosure describes techniques that may enable obtaining coding gains nearly equal to those achieved using KLTs, but potentially with less memory and computation. In some examples, techniques of this disclosure are based on: (a) creating a set of data-specific transforms (i.e., transforms for a particular type of data, such as video data) that can be tested by video encoder 22, and then video encoder 22 may choose the best data-specific transforms (e.g., those that minimize distortion). Video encoder 22 may send (e.g. signal) an index of the chosen transform for use by video decoder 30. Additionally, techniques of this disclosure are based on (b) a technique to approximate the multiplication of a vector by the transform matrix, called a Compact Multi-Pass Transform (CMPT). The techniques of this disclosure may use less memory and computation, as compared to the non-separable matrix based operations, because CMPT techniques are specifically optimized for video coding purposes, and use coding gain estimates to identify unimportant transform parameters and computations. CMPTs allow for many types of implementations, and, as a practical example, an implementation based on a transform approximation technique called Hypercube-Givens Transform (HyGT) is described herein.

Figure 2:
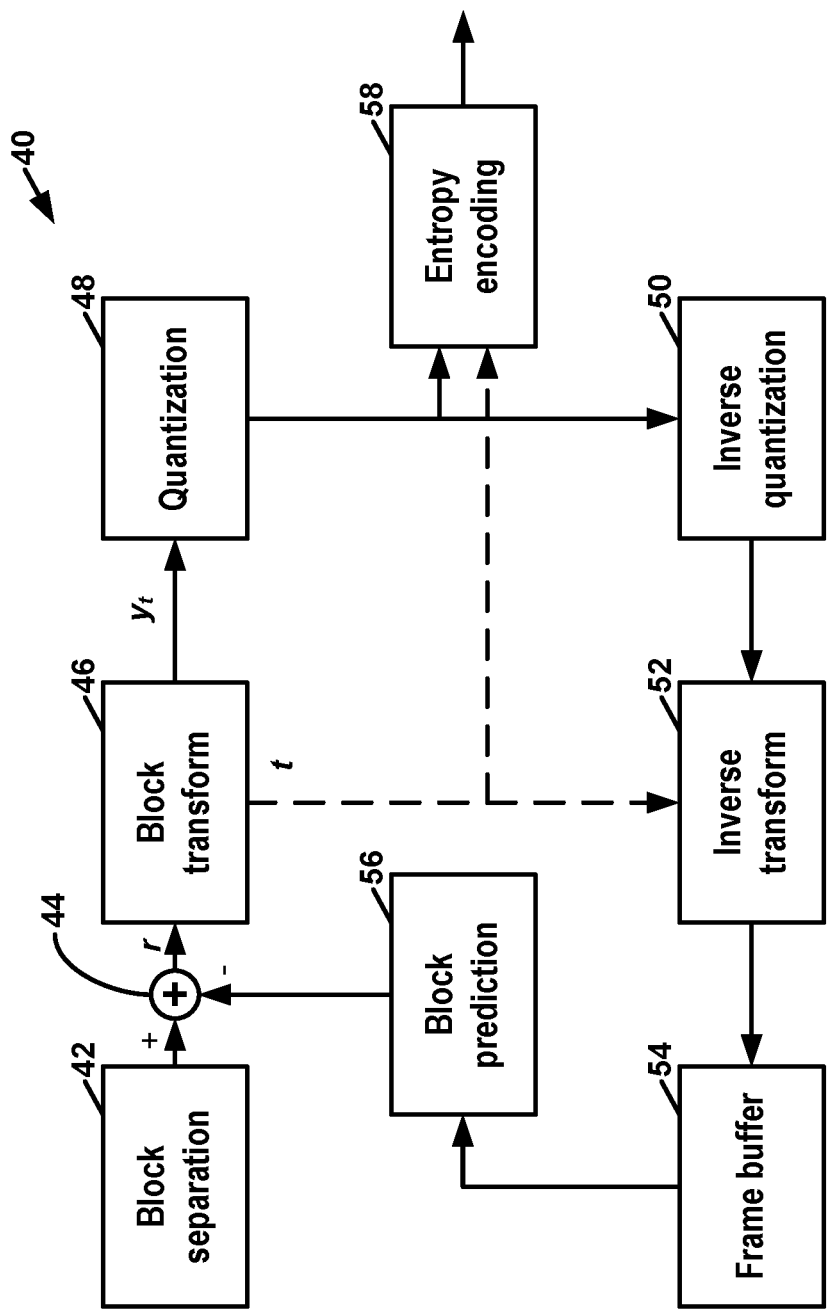
FIG. 2 is a block diagram illustrating an example system for hybrid video encoding with transform selection.

FIG. 2 is a block diagram illustrating an example system 40 for hybrid video encoding with transform selection. Particularly, FIG. 2 shows a diagram of a video encoding system (i.e., a video encoder, such as video encoder 22), where video frames are first divided into pixel blocks (block separation 42). Example types of pixel blocks may include coding blocks for CUs. Furthermore, in FIG. 2, in each block, the video encoder subtracts each pixel value from its predicted value (44). The video encoder may numerically transform the blocks of differences (i.e., residuals) using a linear operation (block transform 46). In the example of FIG. 2, r denotes residual data, $y_t$ denotes transformed residual data, and t denotes an indication of which transform was applied to the residual to generate $y_t$.

A linear transformation can be implemented by matrix-vector multiplications, but video coding applications have been using some special fast transforms that have fixed coefficients derived from trigonometric functions, and that can be computed much more efficiently than the equivalent matrix-vector products. See V. Britanak, P. C. Yip, and K. R. Rao, Discrete Cosine and Sine Transforms: General Properties, Fast Algorithms and Integer Approximations, Academic Press, 2007. This disclosure describes some possible further improvements using CMPT, where sets of vector transformations are used in a pipeline fashion to feed output values generated by a vector transformation to subsequent vector transformation in the pipeline, with each respective vector transformation receiving one or more parameters as inputs in addition to the outputs from previous vector transformation.

In FIG. 2, the video encoder may quantize the transformed residual data (quantization 48) and inverse quantize (inverse quantization 50) the quantized transformed residual data. Furthermore, the video encoder may apply an inverse transform to the inverse quantized transformed residual data (inverse transform 52) to recover the residual data. A frame buffer 54, also called a decoded picture buffer (DPB), of the video encoder stores reconstructed pixel blocks determined based on the residual data. The video encoder may use reconstructed pixel blocks stored in frame buffer 54 for prediction of other pixel blocks (block prediction 56). In the example of FIG. 2, the inverse transform applied to the transformed residual data by the video encoder may be determined based on the transform previously applied to generate the transformed residual data. The indication of which transform was applied to generate the transformed residual data may be provided to an entropy encoding unit 58 of the video encoder. The entropy encoding unit 58 may entropy encode a syntax element indicating the transform along with syntax elements indicating the quantized transformed residual data.

FIGS. 3A and 3B show example options for applying transforms to a two-dimensional block of video residuals. Particularly, FIG. 3A is a conceptual diagram illustrating an example option for computing separable transforms in a two-dimensional block of pixel residuals. FIG. 3B is a conceptual diagram illustrating an example option for computing non-separable transforms in a two-dimensional block of pixel residuals.

In the first option (e.g., FIG. 3A), called separable, the residuals are transformed separately, first in rows and then in columns (or vice-versa), as indicated by the arrows in FIG. 3A. More specifically, for each respective row of an N×N input block 60, a video encoder/decoder (generically referred to as video coder) produces a row of an intermediate block 62 by multiplying a vector consisting of elements of the respective row by an N×N transform matrix. For each respective column of intermediate block 62, the video coder produces a column of an output block by multiplying a vector consisting of elements of the respective column by an N×N transform matrix.

In the second type of block transformation (e.g., FIG. 3B), called non-separable, all residuals are put together into a single vector, as shown in FIG. 3B, and are transformed together. This option does not exploit the two-dimensional structure of the pixel blocks, but this option may be more general and powerful, and can exploit directional features different from horizontal and vertical. For instance, for an input block 64 consisting of N×N values, the transform matrix is $N^2 \times N^2$. To determine an output block or vector 66, the video coder multiplies input block 64 by the transform matrix.

To minimize the computational complexity, prior to HEVC, video coding standards used only one block size and one type of separable transform (i.e., the DCT). With the recent adoption of HEVC, separable transforms are defined for several block sizes, and the Discrete Sine Transform (DST) has been adopted.

Even better compression can be achieved if a video encoder can test several different transforms, use the transform that yields best compression, and send an index t of the used transform to a video decoder, as shown in FIG. 2 (See Y. Ye and M. Karczewicz, "Improved H.264 intra coding based on bi-directional intra prediction, directional transform, and adaptive coefficient scanning," in *Proc. IEEE Int. Conf. Image Process.*, San Diego, Calif., October 2008, pp. 2116-2119; S. Takamura and A. Shimizu, "On intra coding using mode dependent 2D-KLT," in *Proc. 30th Picture Coding Symp.*, San Jose, Calif., December 2013, pp. 137-140; O. G. Sezer, O. G. Guleryuz, and Y. Altunbasak, "Approximation and compression with sparse orthonormal transforms," *IEEE Trans. Image Processing*, pp. 2328-2343, August 2015; and H. E. Egilmez, A. Said, Y.-H. Chao, and A. Ortega, "Graph-based transforms for inter predicted video coding," in *Proc. IEEE Int. Conf. Image Process.*, Quebec City, Canada, September 2015, pp. 3992-3996). In some examples, the index t may identify the transform by indicating the transform in a list of transforms.

This disclosure considers that an optimal KLT is derived by first computing, for each transform index t, a conditional residual correlation matrix $$C_t = E_{r|t}\{r\,r'\}, \tag{1}$$

and then computing an orthogonal matrix $K_t$ that diagonalizes the correlation matrix, i.e., $$K_t C_t K'_t = D_t. \tag{2}$$

Matrix $K_t$ is normally used directly for the computation of the vector of transform coefficients $y_t$ (FIG. 2), through the matrix-vector product $$y_t = K_t r. \tag{3}$$

Figure 4B:
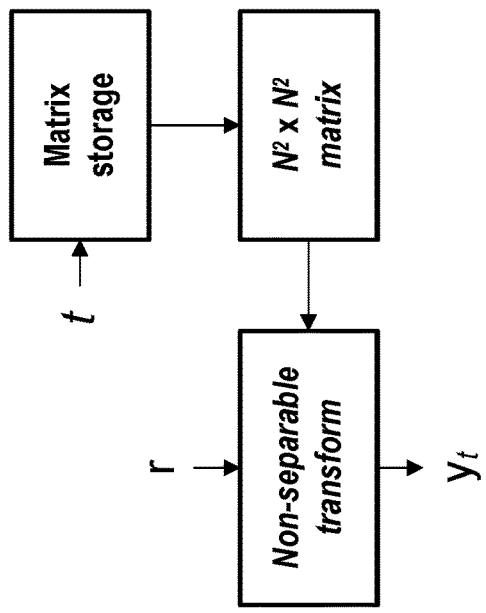
FIGS. 4A-4B illustrate example storage usages for matrix-based transforms of video residuals or transform coefficients.
Figure 4A:
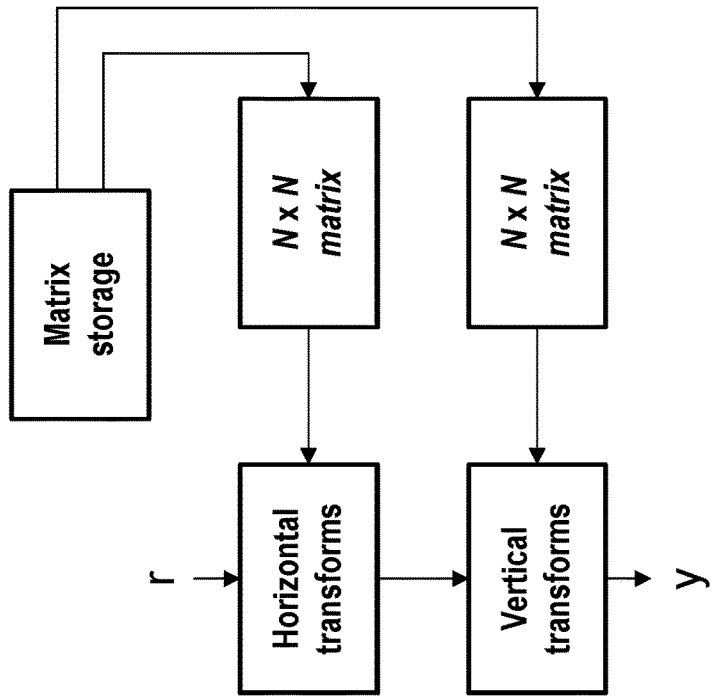

FIGS. 4A-4B illustrate example storage requirements for matrix-based transforms of video residuals. Particularly, FIG. 4A illustrates the common single separable transform, which may use a relatively small amount memory, but may not be optimal. FIG. 4B illustrates the generalization to multiple non-separable transforms that may yield better compression. However, the use of multiple non-separable transforms may require a large number of much larger matrices, which may result in the use of a relatively large amount of memory. In some examples, said large memory usage prevents the use of multiple non-separable transforms from being widely adopted.

Current matrix-based techniques for non-separable transforms may require excessive demands on memory and computation. Later parts of this disclosure explain how the techniques of this disclosure may address the problem.

Table I, below, shows the computational complexity of the different types of 2-D linear transformations (the last row of Table 1 is explained in detail below). Since block sizes N are defined as powers of two, i.e., $N=2^B$, this translates into exponential complexity growth, and there can be considerable differences between the different transform types.

TABLE I

Memory and arithmetic operations complexity of different types 2-D block transforms ($2^B \times 2^B$ block) with P passes.

| Transform type | Memory | Operations | Operations/pixel |
| --- | --- | --- | --- |
| Fast, separable | $O(B\,2^B)$ | $O(B\,2^{2B})$ | $O(B)$ |
| Matrix-based, separable | $O(2^{2B})$ | $O(2^{3B})$ | $O(2^B)$ |
| Matrix-based, non-separable | $O(2^{4B})$ | $O(2^{4B})$ | $O(2^{2B})$ |
| CMPT, non-separable | $O(P\,2^{2B})$ | $O(P\,2^{2B})$ | $O(P)$ |

In Table I, the relative measure of operations per pixel computed is considered, since only one transform is selected and used by a video decoder. The memory requirements, on the other hand, cannot be measured in relative terms, since all matrices have to be stored. It is also important to note that some video applications may require hundreds or thousands of different matrices, which may need to be stored in expensive fast memory.

In early implementations of video coding only the simplest approaches, the fast separable transform, were practically feasible. Now, matrix-based non-separable transforms for small block sizes (e.g., 4×4 blocks) can be considered, but the requirements may grow too fast with block size, and may become prohibitive for larger blocks.

What is missing is a solution that efficiently implements non-separable transforms, in a way that does not have the same complexity growth as the matrix-based approach. Techniques of this disclosure may provide that type of solution.

Techniques of this disclosure are based on a specific type of feature present in the application of transform coding to video compression. In other applications, the complexity of matrix-vector operations can be reduced by using matrices that are sparse or have special structures. However, those techniques cannot be applied in the video coding case because matrices $K_t$ have to be orthogonal, and if complexity constraints are added directly to the matrices, their compression effectiveness may not be realized.

An example solution of this disclosure is based on the following. First, the technique does not try to compute exactly the KLT transform. Instead, the technique looks for a vector transformation $M_t(x)$ (i.e., a transformation that maps one vector to another vector of the same dimension) that only gives an approximation to the KLT, in the form:

$$z_t = M_t(r) \approx y_t = K_t r. \quad (4)$$

In the equation above, $z_t$ is the output of the transformation t and r is the residual data.

Second, the full matrix-vector product is replaced with a sequence of $P_t$ different vector transformations $M_{t,p}$ (called passes), each with parameter vector $h_{t,p}$, in the functional form $M_{t,p}(x, h_{t,p})$, and the final residual transformation is in the form:

$$z_t = M_{t,P_t}(M_{t,P_t-1}(\ldots M_{t,2}(M_{t,1}(r, h_{t,1}), h_{t,2}) \ldots,\\ h_{t,P_t-1}), h_{t,P_t}). \quad (5)$$

Figure 5:
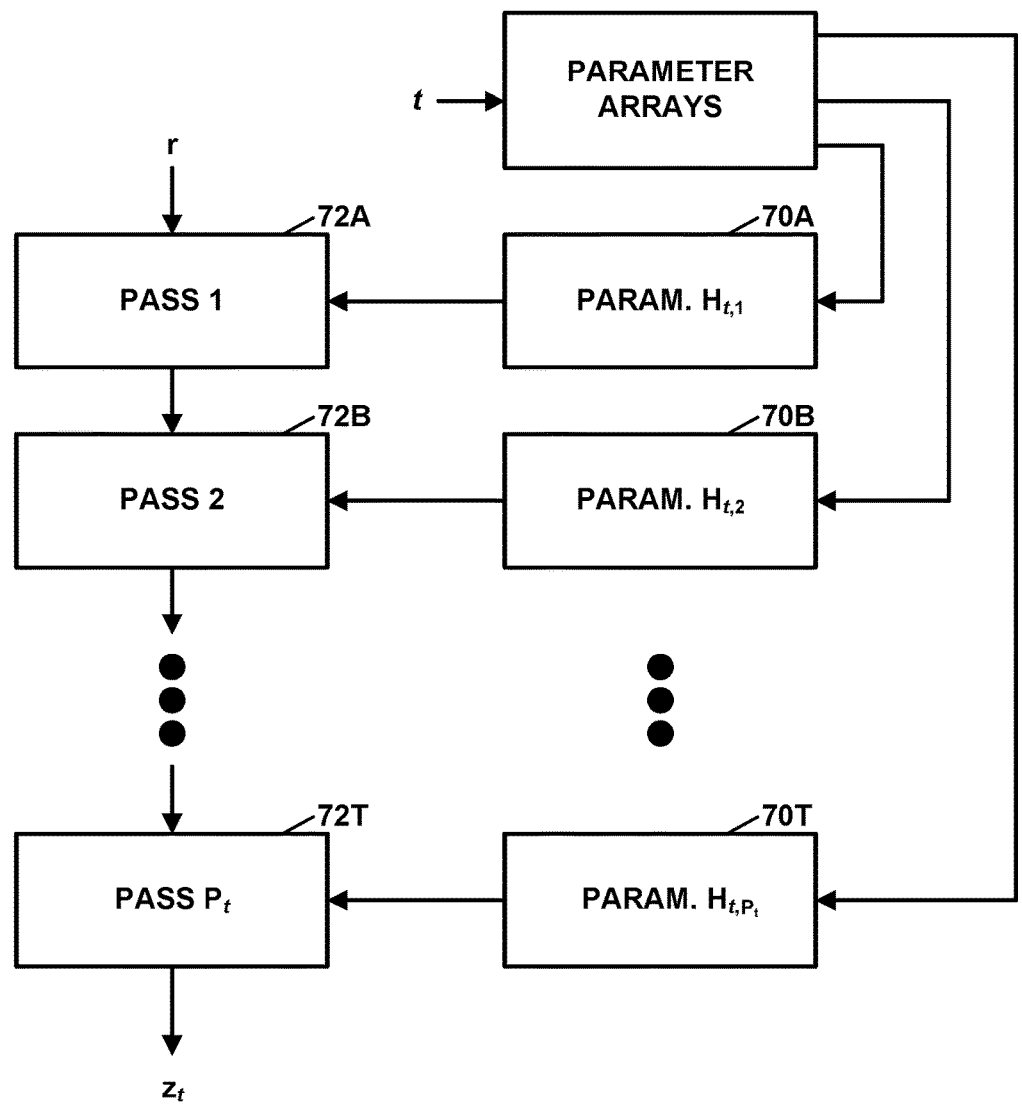
FIG. 5 is a diagram of a Compact Multi-Pass Transform implementation, in accordance with one or more techniques of this disclosure.

The techniques of this disclosure cover this type of vector transformation with $P_t$ passes, which is referred to herein as the Compact Multi-Pass Transform (CMPT). An implementation of a CMPT is shown in the diagram of FIG. 5. In other words, FIG. 5 is a diagram of a Compact Multi-Pass Transform implementation, in accordance with a technique of this disclosure. For the purpose of this disclosure, the definition of a CMPT is quite general, but most of these general features may be needed in practice.

In the example of FIG. 5, a video coder (e.g., video encoder 22, video decoder 30) applies a transform to an input block r. In instances where the video coder is encoding video data, the input block may comprise residual samples. In instances where the video coder is decoding video data, the input block may comprise transform coefficients. Furthermore, in the example of FIG. 5, the video coder determines a plurality of parameter arrays 70A-70T (collectively, parameter arrays 70) based on input t (e.g., index used to identify transform). In some examples, the video coder stores parameter arrays 70 in a memory or derives parameter arrays from data stored in a memory. Input t may indicate which transform to apply. In some examples, input t is an index into a list of transforms. Different transforms may be associated with different parameter arrays and/or different passes. In some examples, input t comprises one or more pieces of data that do not explicitly identify a transform. For instance, input t may comprise one or more of a block size, a prediction mode (e.g., intra or inter prediction), an intra prediction mode, and so on. In such examples, input t may not be an index into the list of transform, but some other information that can be used to determine the transform.

In the example of FIG. 5, to apply the transform, the video coder performs a series of passes 72A-72T (collectively, passes 72). Each respective pass of the series of passes transforms input data based on a respective parameter array of the determined plurality of parameter arrays. The input block r is the input data of the first pass of the series of passes. The input data of each pass of the series of passes other than the first pass is the output data of a previous pass of the series of passes. The output of the last pass of the series of passes is the transformed block $z_t$. As described elsewhere in this disclosure, each pass may comprise a set of orthogonal transformations, such as Givens orthogonal transforms. The video coder may perform the orthogonal transformations within a pass in parallel.

The optimal set of parameters $h_{t,p}$ may be found in various ways. For example, the optimal set of parameters $h_{t,p}$ may be found by performing a search of possible parameter values and identifying combinations of parameter values that tend to yield the best results. In this example, the search may be performed separate from the encoding or decoding process. The normative syntax may define:

1. Which are the transformations that are valid, and what are their allowed parameters;
2. A syntax defining how the encoder conveys the information about the transformation and respective parameters to be used for decoding.

In some examples, the optimal set of parameters may be precomputed and stored at each of video encoder 22 and video decoder 30.

As an example, in one particular implementation of the CMPT, sequences of parallel Givens orthogonal transformations (rotations), applied to disjoint sets of pairs of vector elements, are used. In some examples, is may be advantageous to have orthogonal transforms for video coding. For instance, video decoder 30 may apply sequences of parallel orthogonal transformations to disjoint sets of pairs of vector elements to generate residual data. As one example, the Givens orthogonal transformations (rotations), which may defined by orthogonal matrices G(m, n, θ) with elements shown in equation (6), below, may be used.

$$G_{i,j}(m,n) = \begin{cases} \cos\theta, & i = j = m \text{ or } i = j = n, \\ \sin\theta, & i = m, j = n, \\ -\sin\theta & i = n, j = m, \\ 1, & i = j \text{ and } i \neq m \text{ and } i \neq n, \\ 0, & \text{otherwise.} \end{cases} \quad (6)$$

Figure 6:
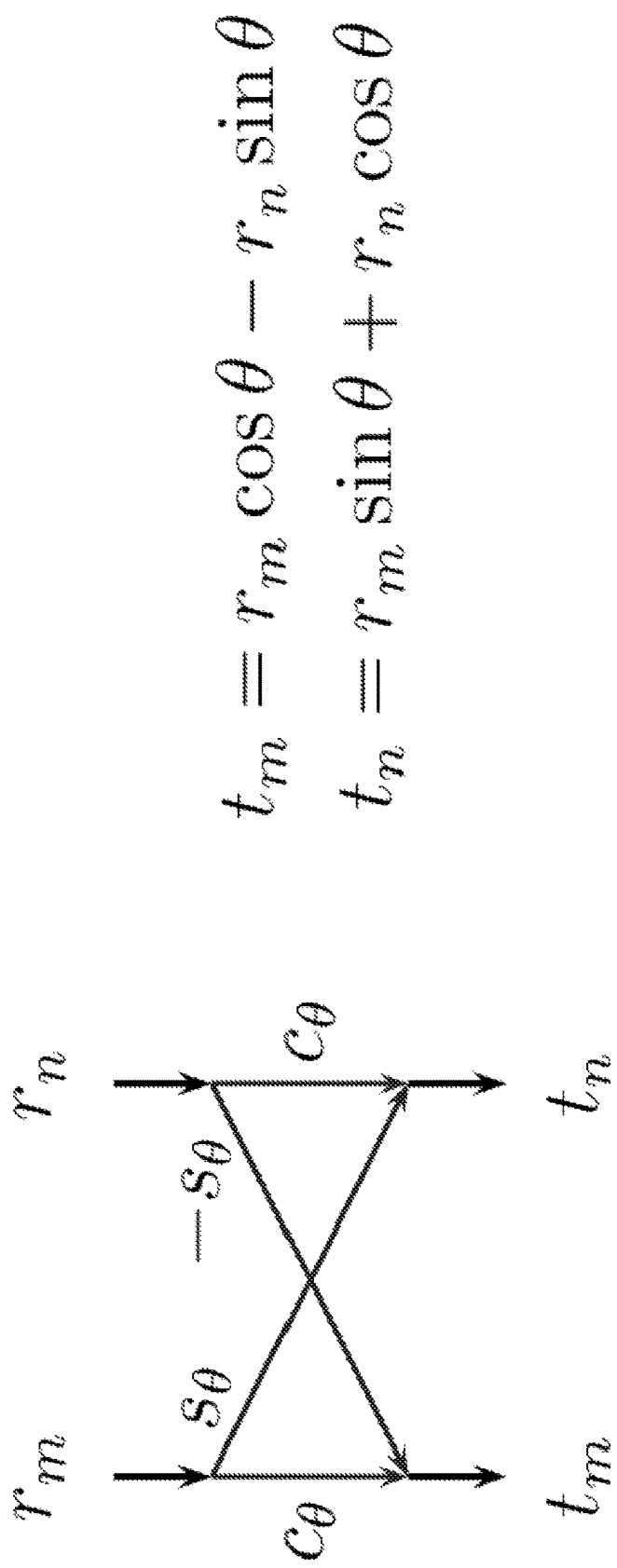
FIG. 6 shows a "butterfly" diagram commonly used to represent a Givens orthogonal transformation, and its mathematical meaning, in accordance with one or more techniques of this disclosure.

FIG. 6 shows the "butterfly" diagram commonly used to represent such transformations, and its mathematical meaning. For instance, FIG. 6 illustrates a "Butterfly" diagram representing a Givens orthogonal transformation, parameterized by angle θ, applied to a pair of vector elements, and the transformation equations. Specifically, in the example of FIG. 6, the butterfly receives $r_m$ and $r_n$ as inputs and also receives a parameter θ as input. The outputs of the butterfly are $t_m$ and $t_n$. $t_m$ is calculated as $\cos(\theta)r_m - \sin(\theta)r_n$. $t_n$ is calculated as $\cos(\theta)r_m + \sin(\theta)r_n$. When applying an inverse transform, video decoder 30 may calculate $r_m$ as $t_m \cos(\theta) + t_n \sin(\theta)$ and $r_n$ as $-t_m \sin(\theta) + t_n \cos(\theta)$.

Givens orthogonal transformations, which are a type of "elementary plane rotations", may be used in other computational methods and signal processing. However, in those applications, the objective is to obtain a certain exact transformation, like diagonalizing a symmetric matrix, or producing a QR matrix decomposition for solving systems of equations.

In those cases, to reduce computational complexity, it may not be desirable to have a large number of transformations, but a large number of transformations is commonly needed to achieve the desired results within floating-point precision. Furthermore, in such cases, the indexes and angles are determined for each computation.

However, in the context of video coding, it may be necessary to pre-determine the indexes and angles, and it may be necessary to choose the indexes and angles to fit the statistics of the video data, in an approximate way. In addition, it may be desirable to keep the number of parameters to an absolute minimum in order to maximize the desired reduction in memory usage. If the Givens rotations are used in the conventional way, the resulting video encoder/decoder may in fact use much more memory than that required by matrix-based transform computations.

Figure 7:
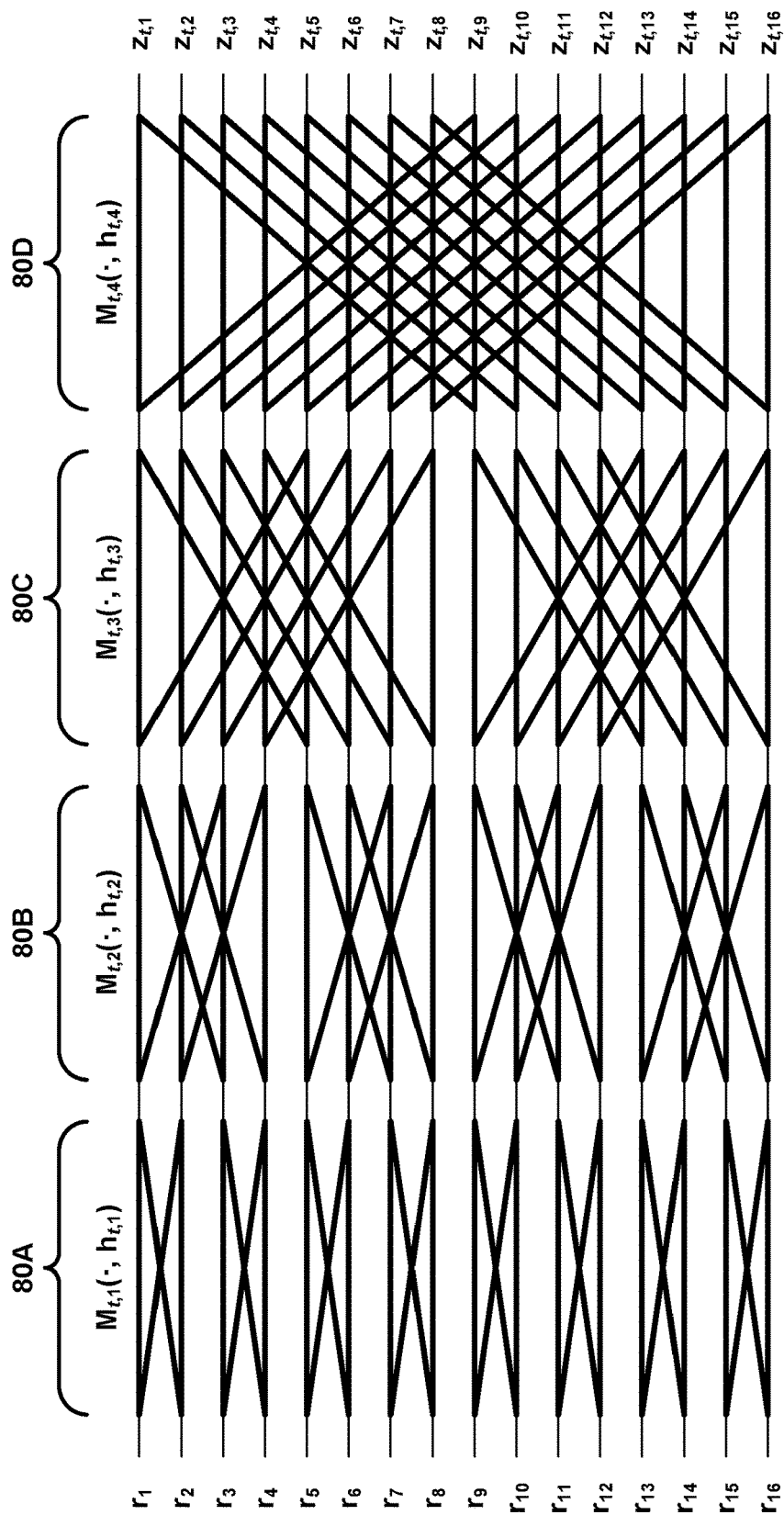
FIG. 7 is a diagram of a Compact Multi-Pass Transform implementation using sequences of parallel Givens rotation, on vectors of dimension 16, in accordance with one or more techniques of this disclosure.
Figure 8:
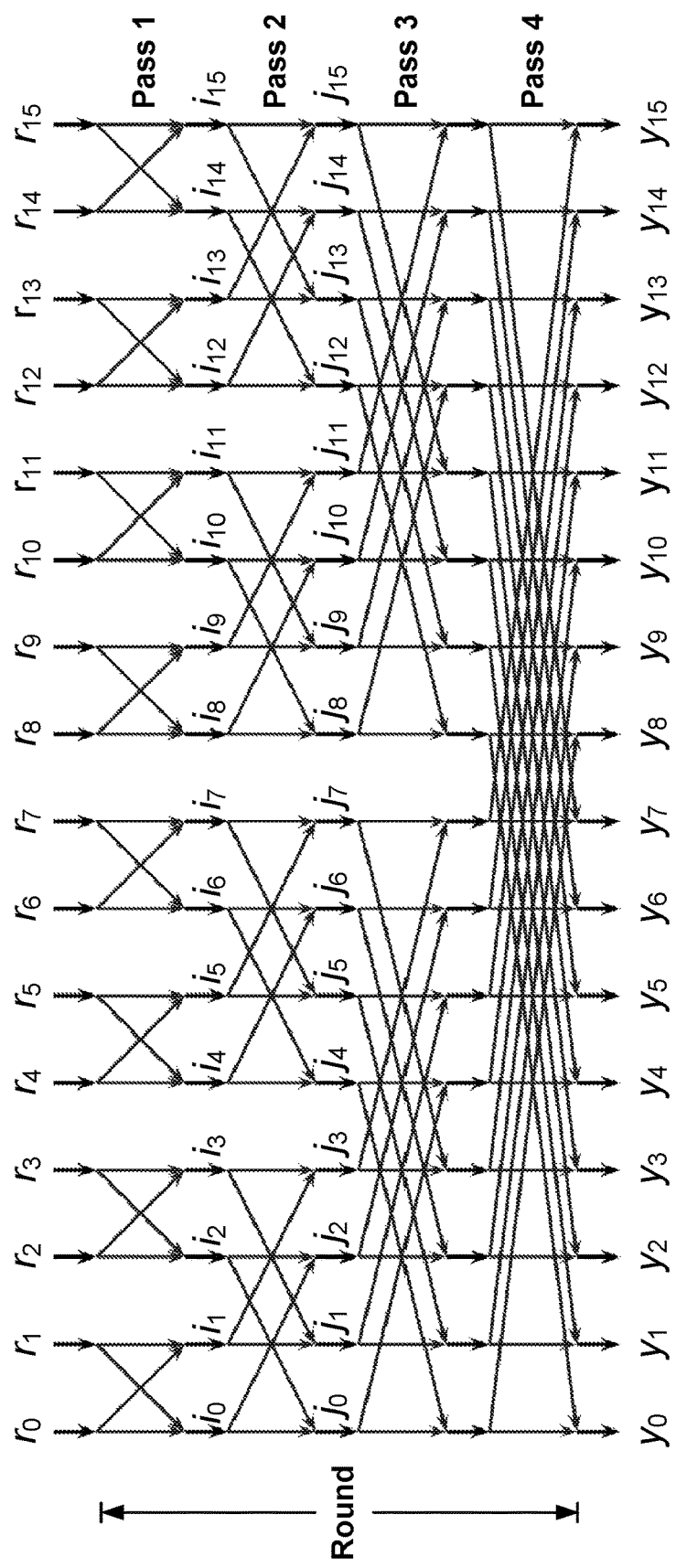
FIG. 8 is a diagram of a Compact Multi-Pass Transform implementation that combine sets of Givens rotations in parallel using a hypercube arrangement, in accordance with one or more techniques of this disclosure.
Figure 9:
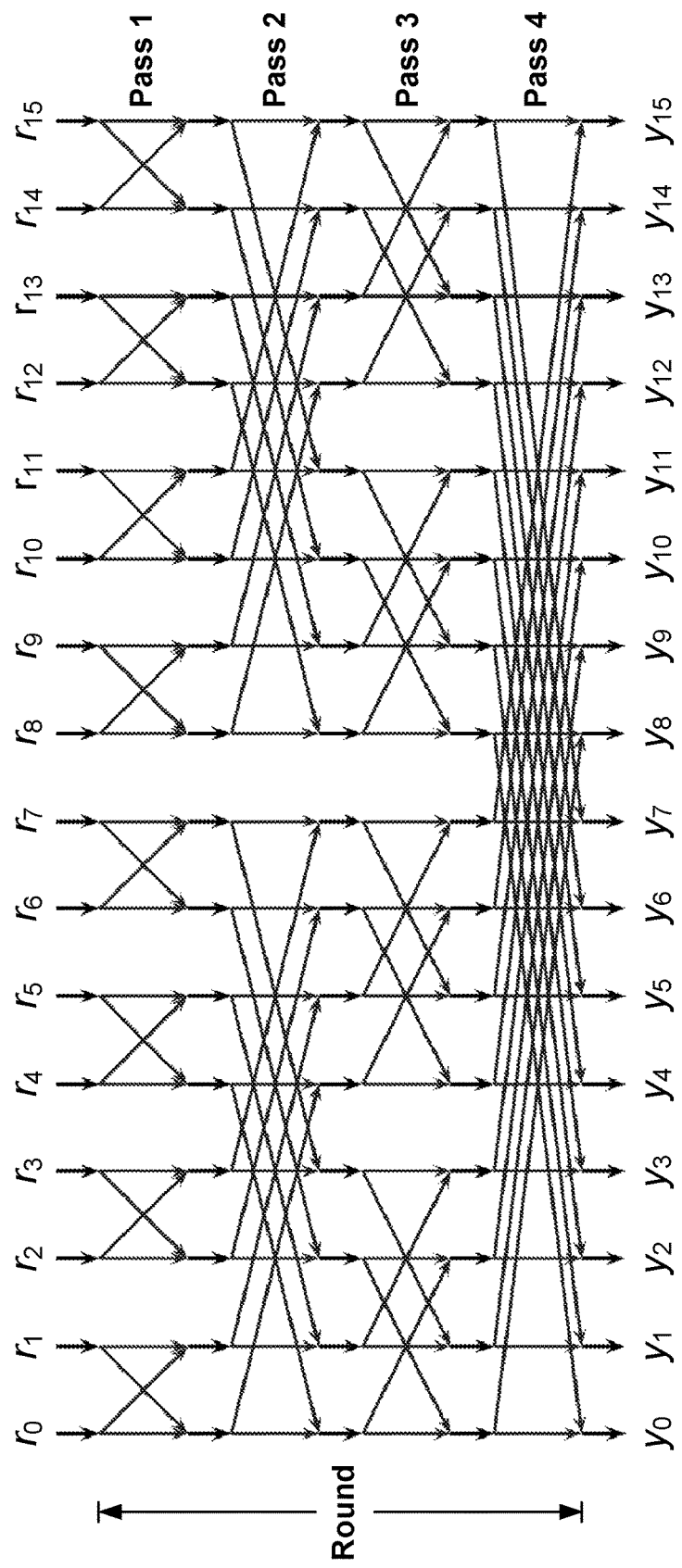
FIG. 9 is a diagram of a Compact Multi-Pass Transform implementation that combine sets of Givens rotations in parallel using a hypercube arrangement, in accordance with one or more techniques of this disclosure.

Those Givens rotations can be arranged sequentially accordingly, for instance, to a hypercube topology, as shown in FIGS. 7-9. In such examples, the transforms may be referred to as Hypercube-Givens Transforms (HyGT).

FIG. 7 is a diagram of a Compact Multi-Pass Transform implementation using sequences of parallel Givens rotation on vectors of dimension 16. The Givens rotations are parallel in the sense that the Givens rotations applied within one pass can be applied in parallel. Those Givens rotations can be arranged sequentially accordingly, for instance, to a hypercube topology, as shown in FIG. 7. The transform of FIG. 7 can be considered to have a hypercube topology in the sense that each of inputs may be considered a separate dimension. The example of FIG. 7 is a case that obtains the memory and operations complexity as shown in the last row of Table I. In the example of FIG. 7, the CMPT includes four passes, 80A, 80B, 80C, and 80D. However, in other examples, other numbers of passes are possible.

In the example of FIG. 7, the parameter vectors $h_{t,p}$ (where p is 1, 2, 3, or 4) contain the different angles (θ) to be used by each butterfly, in the corresponding pass. For example, the parameter vector $h_{t,1}$ may be {0°, 20°, 40°, 60°, 80°, 100°, 120°, 140°}, the parameter vector $h_{t,2}$ may be {5°, 25°, 45°, 65°, 85°, 105°, 125°, 145°}, and so on. Since only one angle per butterfly needs to be used, the parameter vectors have half of the dimension of the residual vector r. For instance, in the example of FIG. 7, since the residual vector r includes 16 samples, there are 8 parameters in each of the parameter vectors.

In some examples, video encoder 22 and video decoder 30 may use, and in some instances store, different parameter vectors for different transformations, different block sizes, and different passes. For example, video encoder 22 and video decoder 30 may use parameter vectors {0°, 20°, 40°, 60°} and {5°, 25°, 45°, 65°} with 8×8 blocks. Furthermore, in this example, video encoder 22 and video decoder 30 may use parameter vectors {2°, 22°, 42°, 62°, 82°, 102°, 122°, 142°}, {5°, 25°, 45°, 65°, 85°, 105°, 125°, 145°}, {7°, 27°, 47°, 67°, 87°, 107°, 127°, 147°}, and {0°, 20°, 40°, 60°, 80°, 100°, 120°, 140°} with 16×16 blocks.

In the example of FIG. 7, each butterfly corresponds to a Givens rotation shown in FIG. 6. Thus, in the example of FIG. 7, in each pass, eight Givens rotations are performed (e.g., in parallel). For each respective pass p, each of the Givens rotations in the respective pass may use a different parameter value (e.g., 0) from the parameter vector for the respective pass ($h_{t,p}$). For example, for the top-left butterfly of FIG. 7, if the first parameter value in a parameter vector for round 1 (i.e., $h_{1,1}$) is equal to 45°, the outputs of the top-left butterfly are equal to $\cos(45°)r_1 - \sin(45°)r_2$ and $\cos(45°)r_2 + \sin(45°)r_1$. In some examples, two or more of the Givens rotations in a pass may include the same parameter value (e.g., θ).

In FIG. 7, the structure of transformations $M_{t,p}(x, h_{t,p})$ changes with each pass. Thus, different results are obtained if the order of the parameters or transformations is changed. For example, different results may be obtained if the butterflies of pass 80B of FIG. 7 were swapped with the butterflies of pass 80A of FIG. 7.

In this way, video encoder 22 may determine residual values for a current block of a current picture of the video data. Additionally, video encoder 22 may apply a transformation to the residual values (e.g., r of FIG. 5, values $r_1 \ldots r_{16}$ of FIG. 7) for the current block to derive a plurality of data elements (e.g., $z_t$ of FIG. 5, values $z_{t,1}$ of FIG. 7) for the current block. As part of applying the transformation to the residual values for the current block, video encoder 22 applies a sequence of vector transformations (e.g., passes 72 of FIG. 5, passes 80 of FIG. 7). The input values for the first vector transformation (e.g., pass 72A of FIG. 5, pass 80A of FIG. 7) of the sequence of vector transformations comprise the residual values for the current block. Output values of the last vector transformation (e.g., pass 72T of FIG. 5, pass 80A of FIG. 7) of the sequence of vector transformations comprise the data elements for the current block. For each respective vector transformation of the sequence of vector transformations other than the first vector transformation of the sequence of vector transformations, input values for the respective vector transformation comprise output values of the respective previous vector transformation of the sequence of vector transformations. Each respective vector transformation of the sequence of vector transformations further takes, as input, a respective parameter vector (e.g., $h_{t,1} \ldots h_{t,Pt}$ in FIG. 4, $h_{t,1} \ldots h_{t,4}$ in FIG. 7) for the respective vector transformation, the respective parameter vector for the respective vector transformation comprising one or more parameters. Video encoder 22 may include, in a bitstream that comprises an encoded representation of the current picture, syntax elements having values based on the data elements for the current block.

Video decoder 30 may apply an inverse of the transform used in encoding. For instance, in the example of FIG. 7, $z_{t,1}$ through $z_{t,16}$ may serve as input to the transformation and $r_1$ through $r_{16}$ is output of the transformation. Where Givens orthogonal transformations are used, the inputs of the inverse Givens orthogonal transform are $y_i$ and $y_j$ and the outputs are $r_i$ and $r_j$, and $r_i = \cos(\theta)y_i + \sin(\theta)y_j$; $r_j = \cos(\theta)y_j - \sin(\theta)y_i$.

In this way, video decoder 30 may determine, based on syntax elements in a bitstream that comprises an encoded representation of a current picture of the video data, a plurality of data elements (e.g., transform coefficients, values $z_{t,1}$–$z_{t,16}$ in FIG. 7) for a current block of the current picture. Additionally, video decoder 30 may apply a transformation to the data elements to derive residual values (e.g., values $r_1 \ldots r_{16}$ in FIG. 7) for the current block. The transformation comprises a sequence of vector transformations (e.g., passes 72 of FIG. 5, passes 80 of FIG. 7). As shown in FIG. 7, input values for the first vector (e.g., pass 72A of FIG. 5, pass 80D of FIG. 7) transformation of the sequence of vector transformations comprise the plurality of data elements. Furthermore, as shown in FIG. 7, output values for the last vector transformation (e.g., pass 72T of FIG. 5, pass 80A of FIG. 7) of the sequence of vector transformations comprise the residual values for the current block. For each respective vector transformation of the sequence of vector transformations other than the first vector transformation of the sequence of vector transformations, input values for the respective vector transformation comprise output values of the respective previous vector transformation of the sequence of vector transformations. Furthermore, each respective vector transformation of the sequence of vector transformations further takes, as input, a respective parameter vector (e.g., $h_{t,1} \ldots h_{t,Pt}$ in FIG. 5, $h_{t,1} \ldots h_{t,4}$ in FIG. 7) for the respective vector transformation, the respective parameter vector for the respective vector transformation comprising one or more parameters. As described elsewhere in this disclosure, video decoder 30 may reconstruct, based on the derived residual data, samples of the current picture.

FIGS. 8 and 9 are diagrams of HyGT implementations that combine sets of Givens rotations in parallel using a hypercube arrangement, in accordance with one or more techniques of this disclosure. These examples may be similar to the graphical representation of the Fast Fourier Transform (FFT), which also corresponds to a hypercube. However, while FFTs are defined for complex numbers and use the same factors for all "butterflies" in each pass, HyGT is defined for real numbers and uses different parameters for each butterfly. In some examples, the parameters used for the butterflies in HyGT may be respective angles that define the respective HyGT.

There is no unique way of defining how the data elements are organized on a hypercube, but the arrangement in FIG. 8, and the alternative in FIG. 8 may be particularly suitable for pixels from a 2-D block, arranged in a scan order (e.g., a raster scan order, a snake scan order, etc.). The examples of FIGS. 8 and 9 are also cases where the memory and operations complexity as shown in the last row of Table 1 may be obtained.

Figure 10:
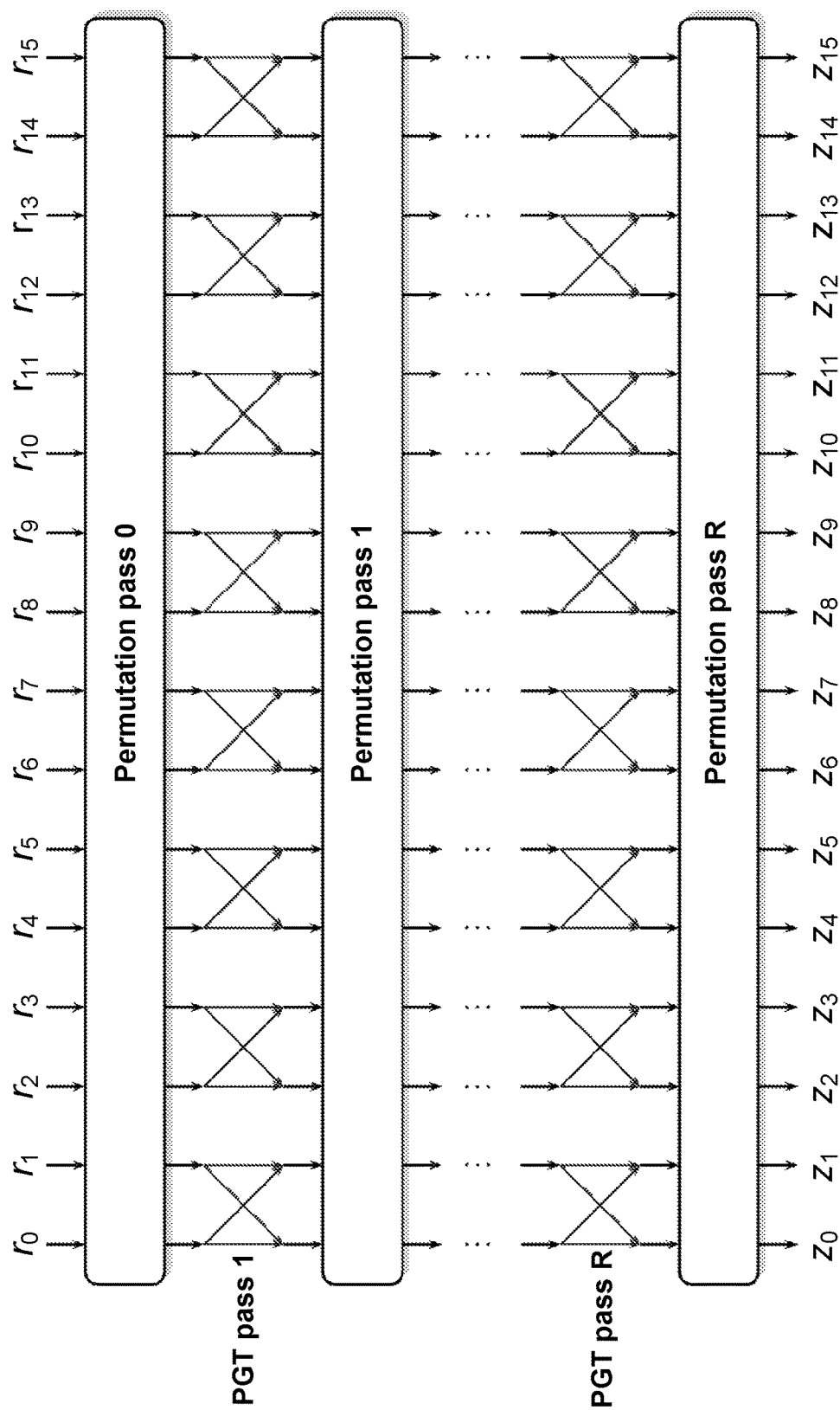
FIG. 10 illustrates a general form of Compact Multi-Pass Transform, which may be referred to as the Parallel-Givens Transform, in accordance with one or more techniques of this disclosure.

There may a great deal of freedom in using the Givens rotations in parallel for transform computation. To that end, FIG. 10 illustrates a general form of HyGT, which may be referred to as the Parallel-Givens Transform (PGT), in accordance with one or more techniques of this disclosure. In example of FIG. 10, the structure of the butterflies does not need to change (i.e., for each pass), and instead the video coder may perform permutation passes that move the data appropriately. In the Parallel-Givens Transform, the permutations of values in each pass are not fixed (i.e., the inputs to each "butterfly" are adjustable). By contrast, in the examples of FIGS. 8 and 9, the permutations of values in each pass may be considered to be fixed. Additionally, a video coder that performs the Parallel-Givens Transform of FIG. 10 may perform a permutation pass to sort transform coefficients (e.g., according to their variance).

In some examples where the permutations are flexible (e.g., the example of FIG. 10), permutation pass 0 may directly pass the values without sorting. For instance, permutation pass 0 may route the inputs to accomplish the same butterflies as pass 80A of FIG. 7. Similarly, permutation pass 1 may route outputs of PGT pass 1 to accomplish the same butterflies as pass 80B of FIG. 7, permutation pass 2 may route outputs of PGT pass 2 to accomplish the same butterflies as pass 80C, and so on. In other examples, the permutations may route the values to accomplish the same butterflies as FIG. 9. In this way, different transforms may be accomplished without changing the butterfly structure.

Additionally, by using flexible permutations, the same hardware may be used for different size blocks. For instance, the hardware for a 4×4 block (with 16 residual values), such as FIG. 9, may not be directly compatible (i.e., without modification) with a 2×2 block because there would be more output values than input values. However, with the permutation logic of FIG. 10, the same butterfly hardware can be reused, but the permutation logic never routes outputs to wrong butterflies. For instance, in FIG. 10, for 2×2 block, only leftmost 4 butterflies are actually used, while for a 4×4 block, all eight butterflies may be used. In this way, different transforms may be accomplished without changing the butterfly structure.

Figure 11:
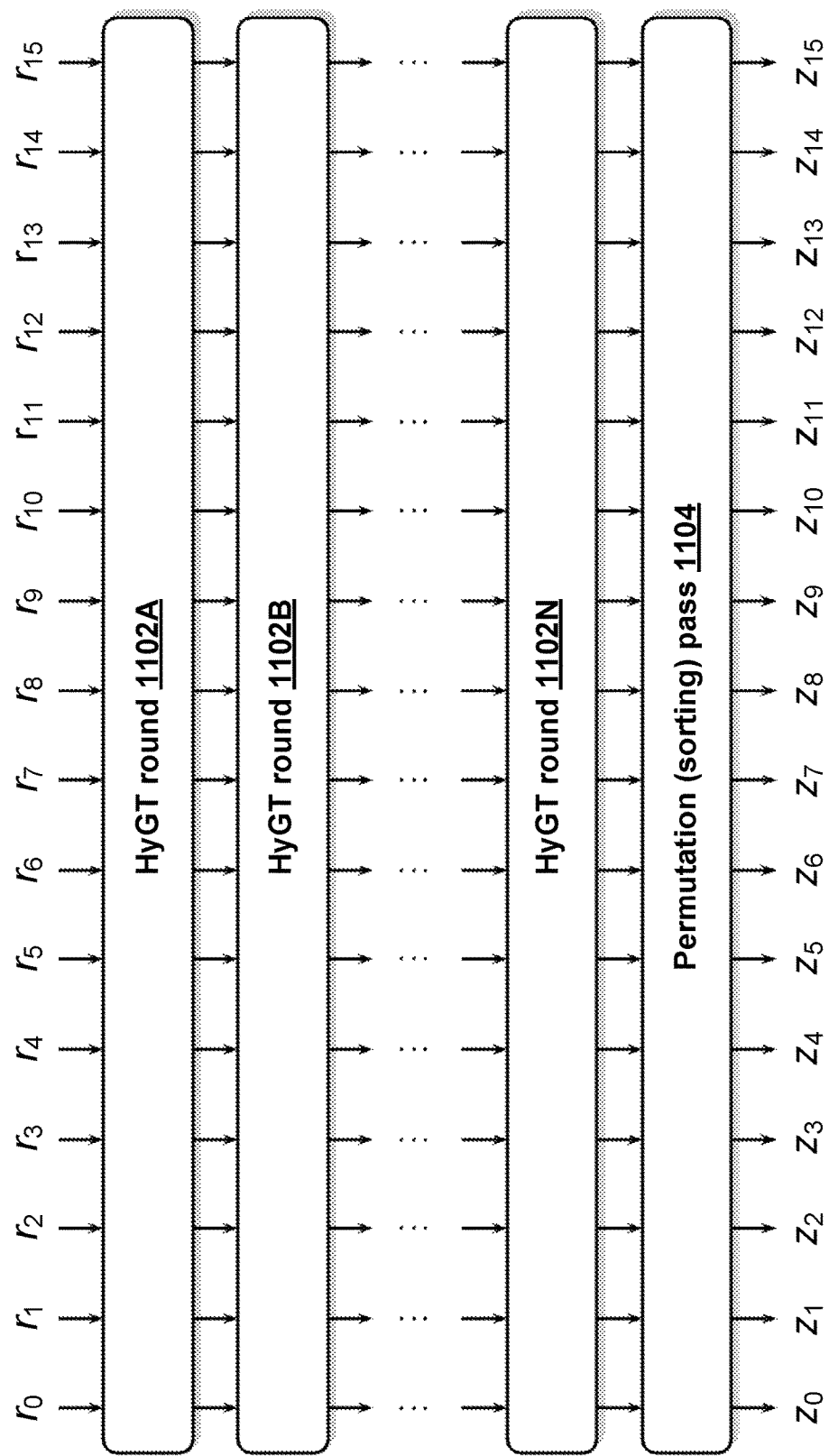
FIG. 11 illustrates an example Compact Multi-Pass Transform implementation where a video coder performs multiple rounds of a multi-pass non-separable inverse transformation, in accordance with one or more techniques of this disclosure.

In some examples, to perform HyGT, a video coder may perform multiple rounds of the multi-pass non-separable inverse transformation. For instance, a video coder may repeat the rounds shown in FIGS. 8 and 9, but with different sets of parameters. In this instance, the video coder may apply a first round using the transform of FIG. 8 and a first set of parameters, a second round using the transform of FIG. 9 and a second set of parameters, a third round using the transform of FIG. 8 and a third set of parameters different form the first set of parameters, and a fourth round using the transform of FIG. 9 and a fourth set of parameters different from the second set of parameters. FIG. 11 illustrates an example HyGT implementation where a video coder performs rounds 1102A-1102N (collectively, "rounds 1102") of a multi-pass non-separable inverse transformation, such as the multi-pass non-separable inverse transformation shown in FIGS. 8 and 9. For instance, in each of rounds 1102, a video coder may perform multiple passes (such as passes 80 of FIG. 7).

At the encoder side, the first pass of a first round may take, as input values, residual data that represents pixel differences between a current block of video data and a predictive block of video data. A video encoder, such as video encoder 22, may obtain a respective plurality of pre-defined parameters that each indicate a respective angle θ for the first pass in the first round of the multi-pass non-separable inverse transformation. In some examples, the pre-defined parameters may be stored by a memory of the video encoder. The video encoder may perform respective Givens orthogonal transformations on respective pairs of the residual data to generate respective pairs of output values of a plurality of output values for the first pass.

A second pass of the first round may take, as input values, the output values from the first pass of the first round. The video encoder may obtain a respective plurality of pre-defined parameters that each indicate a respective angle θ for the second pass in the first round of the multi-pass non-separable inverse transformation. The video encoder may perform respective Givens orthogonal transformations on respective pairs of the output values of the first pass to generate respective pairs of output values of a plurality of output values of the second pass.

The video encoder may continue to perform passes until each input value has "touched" each other input value exactly once. In this sense, the number of passes within each round may be a function of the number of residual data values being encoded. For instance, as shown in the examples of FIGS. 7-9, a video encoder may perform four passes per round when encoding sixteen values.

The video encoder may utilize the input from completed rounds as input for subsequent rounds. As discussed above, at the encoder side, the first pass of a first round may take, as input values, residual data that represents pixel differences between a current block of video data and a predictive block of video data. Similarly, the second pass of the first round may take, as input values, output values from the first pass. In more general terms, pass X may use the output of pass X−1 as input values.

In some examples, such as the example of FIG. 11, after performing the rounds of the multi-pass non-separable inverse transformation, a video coder may optionally perform a permutation pass 1104 to sort transform coefficients. In some examples, the transform coefficients may be sorted according to their variance.

Various examples have been described. Particular examples of this disclosure may be used separately or in combination with one another.

Figure 12:
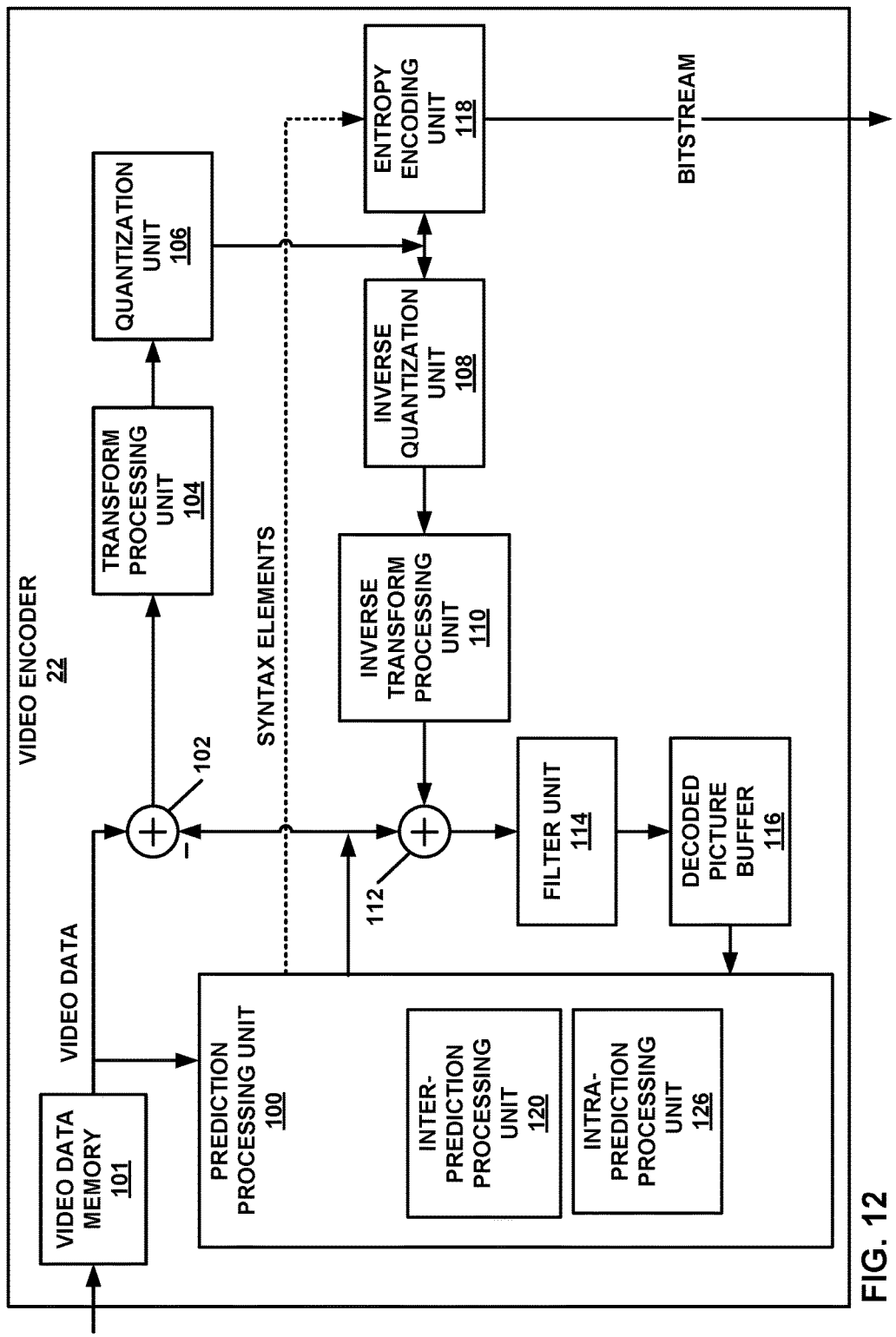
FIG. 12 is a block diagram illustrating an example of a video encoder that may perform one or more techniques of this disclosure.

FIG. 12 is a block diagram illustrating an example video encoder 22 that may implement the techniques of this disclosure. FIG. 12 is provided for purposes of explanation and should not be considered limiting of the techniques as broadly exemplified and described in this disclosure. The techniques of this disclosure may be applicable to various coding standards or methods.

Processing circuitry includes video encoder 22, and video encoder 22 is configured to perform one or more of the example techniques described in this disclosure. For instance, video encoder 22 includes integrated circuitry, and the various units illustrated in FIG. 12 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 12 may be software units executing on the processing circuitry. In such examples, the object code for these software units is stored in memory. An operating system may cause video encoder 22 to retrieve the object code and execute the object code, which causes video encoder 22 to perform operations to implement the example techniques. In some examples, the software units may be firmware that video encoder 22 executes at startup. Accordingly, video encoder 22 is a structural component having hardware that performs the example techniques or has software/firmware executing on the hardware to specialize the hardware to perform the example techniques.

In the example of FIG. 12, video encoder 22 includes a prediction processing unit 100, a video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 22 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 22 and video decoder 30 may support PU sizes of 2N×2N or N×N for intra prediction, and symmetric PU sizes of 2N×2N, 2N×N, N×2N, N×N, or similar for inter prediction. Video encoder 22 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

In accordance with one or more techniques of this disclosure, as opposed to using a separable transform or a matrix transform to transform the transform blocks, transform processing unit 104 may implement the Compact Multi-Pass Transform (CMPT) techniques described elsewhere in this disclosure. As one example, transform processing unit 104 may perform a multi-pass non-separable transform to generate a transform coefficient block that encodes a residual block for a current block of video data. To perform a respective pass of the multi-pass non-separable transformation, transform processing unit 104 may obtain a plurality of pre-defined parameters that each indicate a respective angle θ and perform, based on a respective parameter of the plurality of pre-defined parameters, respective Givens orthogonal transformations on respective pairs of input values of a plurality of input values to generate respective pairs of output values of a plurality of output values.

When performing a first pass of the multi-pass non-separable transformation, transform processing unit 104 may use the coefficients of a residual block as the plurality of input values. For instance, as shown in the example of FIG. 8, transform processing unit 104 may perform the first pass (i.e., Pass 1) by performing a Givens orthogonal transformation on $r_0$ and $r_1$ using a first pre-defined parameter to generate output values $i_0$ and $i_1$, a Givens orthogonal transformation on $r_2$ and $r_3$ using a second pre-defined parameter to generate output values $i_2$ and $i_3$, a Givens orthogonal transformation on $r_4$ and $r_5$ using a third pre-defined parameter to generate output values $i_4$ and $i_5$, a Givens orthogonal transformation on $r_6$ and $r_7$ using a fourth pre-defined parameter to generate output values $i_6$ and $i_7$, a Givens orthogonal transformation on $r_8$ and $r_9$ using a fifth pre-defined parameter to generate output values is $i_8$ and $i_9$, a Givens orthogonal transformation on $r_{10}$ and $r_{11}$ using a sixth pre-defined parameter to generate output values $i_{10}$ and $i_{11}$, a Givens orthogonal transformation on $r_{12}$ and $r_{13}$ using a seventh pre-defined parameter to generate output values $i_{12}$ and $i_{13}$, and a Givens orthogonal transformation on $r_{14}$ and $r_{15}$ using an eighth pre-defined parameter to generate output values $i_{14}$ and $i_{15}$.

When performing subsequent passes of the multi-pass non-separable transformation (i.e., passes other than the first pass), transform processing unit 104 may use the plurality of output values generated for a most recent previous pass of the multi-pass non-separable transformation. For instance, when performing an N'th pass of the multi-pass non-separable transformation, transform processing unit 104 may use the plurality of output values generated for the N−1th pass of the multi-pass non-separable transformation. For instance, as shown in the example of FIG. 8, transform processing unit 104 may perform the second pass (i.e., Pass 2) by performing a Givens orthogonal transformation on $i_0$ and $i_1$ using a first pre-defined parameter to generate output values $j_0$ and $j_1$, a Givens orthogonal transformation on $i_2$ and $i_3$ using a second pre-defined parameter to generate output values $j_2$ and $j_3$, a Givens orthogonal transformation on $i_4$ and $i_5$ using a third pre-defined parameter to generate output values $j_4$ and $j_5$, a Givens orthogonal transformation on $i_6$ and $i_7$ using a fourth pre-defined parameter to generate output values $j_6$ and $j_7$, a Givens orthogonal transformation on $i_8$ and $i_9$ using a fifth pre-defined parameter to generate output values $j_8$ and $j_9$, a Givens orthogonal transformation on $i_{10}$ and $i_{11}$ using a sixth pre-defined parameter to generate output values $j_{10}$ and $j_{11}$, a Givens orthogonal transformation on $i_{12}$ and $i_{13}$ using a seventh pre-defined parameter to generate output values $j_{12}$ and $j_{13}$, and a Givens orthogonal transformation on $i_{14}$ and $i_{15}$ using an eighth pre-defined parameter to generate output values $j_{14}$ and $j_{15}$.

As discussed above, transform processing unit 104 may obtain a plurality of pre-defined parameters that each indicate a respective angle θ. In some examples, transform processing unit 104 may obtain a different respective plurality of pre-defined parameters that each indicate a respective angle θ for each respective pass of the multi-pass non-separable transformation. For instance, in the example of FIG. 8, transform processing unit 104 may obtain a separate plurality of pre-defined parameters for each of Pass 1, Pass 2, Pass 3, and Pass 4. In some examples, transform processing unit 104 may obtain the plurality of pre-defined parameters based on a size of a current block of video data. For instance, transform processing unit 104 may obtain a different plurality of pre-defined parameters when the current block of video data is an 8×8 block compared to when the current block is a 16×16 block. As such, in some examples, the plurality of pre-defined parameters obtained by transform processing unit 104 may depend both on the size of the current block and on the pass of the multi-pass transformation.

In some examples, the pre-defined parameters may be calculated based on one or more test sequences of video data and may be programmed/loaded onto transform processing unit 104. As discussed below, identical pre-defined parameters may be similarly programmed/loaded onto the video decoder, such as inverse transform processing unit 156 of video decoder 30 of FIG. 13.

In some examples, the respective pairs of input values for each pass may always be same every time transform processing unit 104 performs the transformation (i.e., the permutations of input values in each pass may be considered to be fixed.) For instance, in some examples, transform processing unit 104 may always use the respective pairs of input values defined by FIG. 8 or FIG. 9. However, in some examples, it may be desirable for the permutations of input values to be flexible. For example, it may be desirable to not change the structure of the "butterflies" for each pass. In this example, using different permutations of input values may allow for different transforms using the same structure of butterflies in each pass. In some examples, dedicated hardware may implement each butterfly of a pass. By not changing the structure of the butterflies in each pass, the video coder may use the same dedicated hardware for each pass.

In accordance with one or more techniques of this disclosure, transform processing unit 104 may implement a flexible scheme in which a permutation pass is performed (e.g., after each pass of the multi-pass transformation) to re-arrange the data such that the structure of the "butterflies" may be the same for each pass. FIG. 11 illustrates one example of such a flexible scheme.

In some examples, transform processing unit 104 may perform multiple rounds of the multi-pass non-separable inverse transformation. For instance, transform processing unit 104 may repeat the rounds shown in FIGS. 8 and 9, but with different sets of parameters. FIG. 11 illustrates an example implementation in which transform processing unit 104 may perform rounds 1-R of a multi-pass non-separable inverse transformation, such as the multi-pass non-separable inverse transformation shown in FIGS. 8 and 9. In some examples, such as the example of FIG. 11, after performing the rounds of the multi-pass non-separable inverse transformation, transform processing unit 104 may optionally perform a permutation pass to sort transform coefficients (e.g., according to their variance). In any case, transform processing unit 104 may output the transform coefficients to one or more components of video encoder 22, such as quantization unit 106.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents a RQT for a CU.

Figure 13:
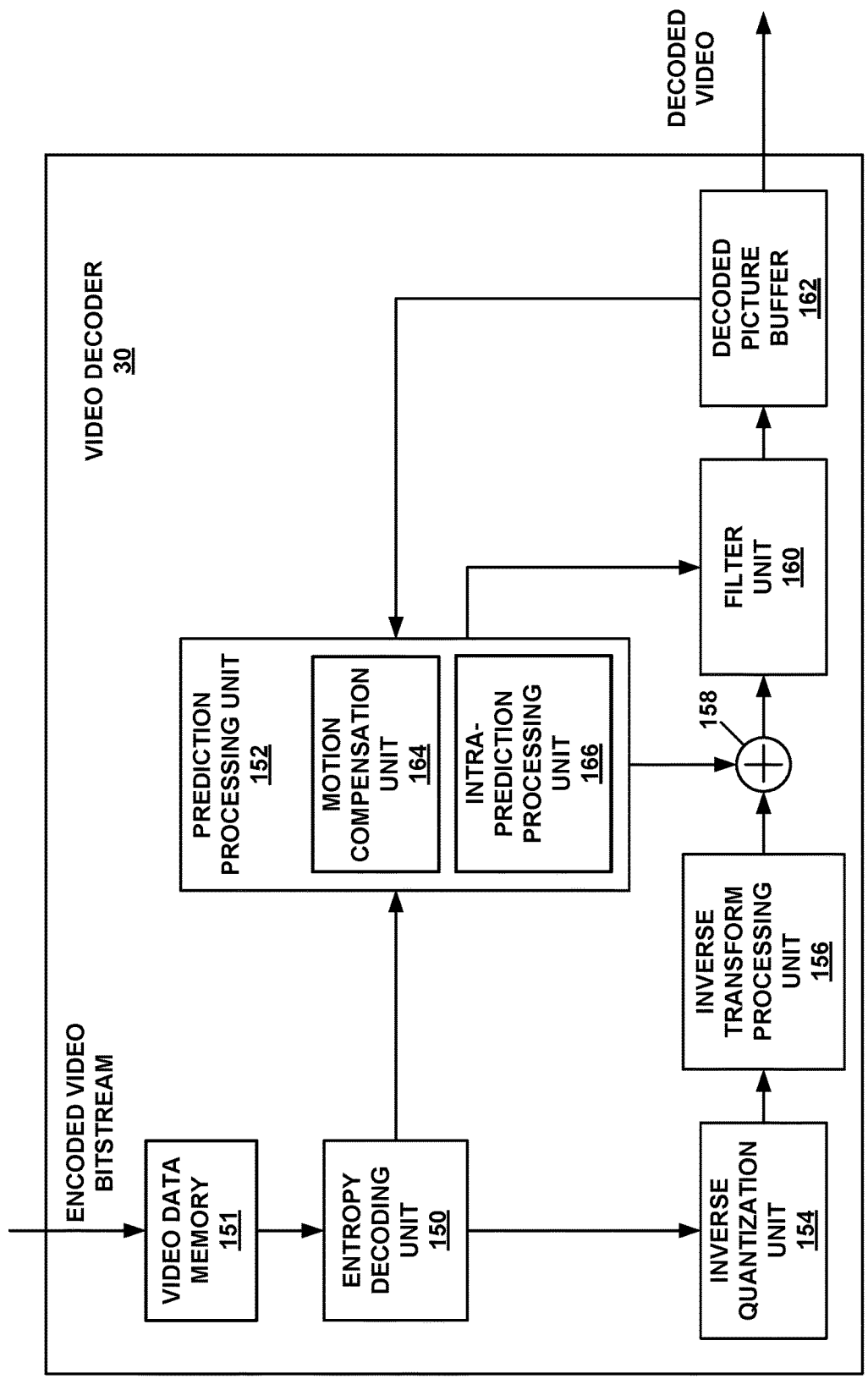
FIG. 13 is a block diagram illustrating an example of a video decoder that may perform one or more techniques of this disclosure.

FIG. 13 is a block diagram illustrating an example video decoder 30 that is configured to implement the techniques of this disclosure. FIG. 13 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 13 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 13 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 13, video decoder 30 includes an entropy decoding unit 150, a video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

In accordance with one or more techniques of this disclosure, as opposed to using a separable transform or a matrix transform to transform the transform blocks, inverse transform processing unit 156 may implement the Compact Multi-Pass Transform (CMPT) techniques described elsewhere in this disclosure. As one example, inverse transform processing unit 156 may perform a multi-pass non-separable inverse transform that is generally inverse to the multi-pass non-separable transform performed by transform processing unit 104 of video encoder 22 of FIG. 12. For instance, to perform a respective pass of the multi-pass non-separable transformation, inverse transform processing unit 156 may obtain a plurality of pre-defined parameters that each indicate a respective angle $\theta$ and perform, based on a respective parameter of the plurality of pre-defined parameters, respective Givens orthogonal transformations on respective pairs of input values of a plurality of input values to generate respective pairs of output values of a plurality of output values.

When performing a first pass of the multi-pass non-separable inverse transformation, inverse transform processing unit 156 may use the coefficients of residual block as the plurality of input values. For instance, as shown in the example of FIG. 8, inverse transform processing unit 156 may perform the first pass (i.e., Pass 1) by performing a Givens orthogonal transformation on $r_0$ and $r_1$ using a first pre-defined parameter to generate output values $i_0$ and $i_1$, a Givens orthogonal transformation on $r_2$ and $r_3$ using a second pre-defined parameter to generate output values $i_2$ and $i_3$, a Givens orthogonal transformation on $r_4$ and $r_5$ using a third pre-defined parameter to generate output values $i_4$ and $i_5$, a Givens orthogonal transformation on $r_6$ and $r_7$ using a fourth pre-defined parameter to generate output values $i_6$ and $i_7$, a Givens orthogonal transformation on $r_8$ and $r_9$ using a fifth pre-defined parameter to generate output values $i_8$ and $i_9$, a Givens orthogonal transformation on $r_{10}$ and $r_{11}$ using a sixth pre-defined parameter to generate output values $i_{10}$ and $i_{11}$, a Givens orthogonal transformation on $r_{12}$ and $r_{13}$ using a seventh pre-defined parameter to generate output values $i_{12}$ and $i_{13}$, and a Givens orthogonal transformation on $r_{14}$ and $r_{15}$ using an eighth pre-defined parameter to generate output values $i_{14}$ and $i_{15}$.

When performing subsequent passes of the multi-pass non-separable transformation (i.e., passes other than the first pass), inverse transform processing unit 156 may use the plurality of output values generated for a most recent previous pass of the multi-pass non-separable transformation. For instance, when performing an Nth pass of the multi-pass non-separable transformation, inverse transform processing unit 156 may use the plurality of output values generated for the N−1th pass of the multi-pass non-separable transformation. For instance, as shown in the example of FIG. 8, transform processing unit 104 may perform the second pass (i.e., Pass 2) by performing a Givens orthogonal transformation on $i_0$ and $i_1$ using a first pre-defined parameter to generate output values $j_0$ and $j_1$, a Givens orthogonal transformation on $i_2$ and $i_3$ using a second pre-defined parameter to generate output values $j_2$ and $j_3$, a Givens orthogonal transformation on $i_4$ and $i_5$ using a third pre-defined parameter to generate output values $j_4$ and $j_5$, a Givens orthogonal transformation on $i_6$ and $i_7$ using a fourth pre-defined parameter to generate output values $j_6$ and $j_7$, a Givens orthogonal transformation on $i_8$ and $i_9$ using a fifth pre-defined parameter to generate output values $j_8$ and $j_9$, a Givens orthogonal transformation on $i_{10}$ and $i_{11}$ using a sixth pre-defined parameter to generate output values $j_{10}$ and $j_{11}$, a Givens orthogonal transformation on $i_{12}$ and $i_{13}$ using a seventh pre-defined parameter to generate output values $j_{12}$ and $j_{13}$, and a Givens orthogonal transformation on $i_{14}$ and $i_{15}$ using an eighth pre-defined parameter to generate output values $j_{14}$ and $j_{15}$.

As discussed above, inverse transform processing unit 156 may obtain a plurality of pre-defined parameters that each indicate a respective angle θ. In some examples, inverse transform processing unit 156 may obtain a different respective plurality of pre-defined parameters that each indicate a respective angle θ for each respective pass of the multi-pass non-separable transformation. For instance, in the example of FIG. 8, inverse transform processing unit 156 may obtain a separate plurality of pre-defined parameters for each of Pass 1, Pass 2, Pass 3, and Pass 4. In some examples, inverse transform processing unit 156 may obtain the plurality of pre-defined parameters based on a size of a current block of video data. For instance, inverse transform processing unit 156 may obtain a different plurality of pre-defined parameters when the current block of video data is an 8×8 block compared to when the current block is a 16×16 block. As such, in some examples, the plurality of pre-defined parameters obtained by inverse transform processing unit 156 may depend both on the size of the current block and on the pass of the multi-pass transformation.

In some examples, the respective pairs of input values for each pass may always be same every time inverse transform processing unit 156 performs the transformation (i.e., the permutations of input values in each pass may be considered to be fixed.) For instance, in some examples, inverse transform processing unit 156 may always use the respective pairs of input values defined by FIG. 8 or FIG. 9. However, in some examples, it may be desirable for the permutations of input values to be flexible. For instance, it may be desirable to not change the structure of the "butterflies" for each pass.

In accordance with one or more techniques of this disclosure, inverse transform processing unit 156 may implement a flexible scheme in which a permutation pass is performed (e.g., after each pass of the multi-pass transformation) to re-arrange the data such that the structure of the "butterflies" may be the same for each pass. FIG. 11 illustrates one example of such a flexible scheme.

In some examples, inverse transform processing unit 156 may perform multiple rounds of the multi-pass non-separable inverse transformation. For instance, a video coder may repeat the rounds shown in FIGS. 8 and 9, but with different sets of parameters. FIG. 11 illustrates an example implementation in which inverse transform processing unit 156 may perform rounds 1-R of a multi-pass non-separable inverse transformation, such as the multi-pass non-separable inverse transformation shown in FIGS. 8 and 9. In some examples, such as the example of FIG. 11, after performing the rounds of the multi-pass non-separable inverse transformation, inverse transform processing unit 156 may optionally perform a permutation pass to sort transform coefficients (e.g., according to their variance). In any case, inverse transform processing unit 156 may output the transform coefficients to one or more components of video decoder 30, such as quantization unit reconstruction unit 158.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 14:
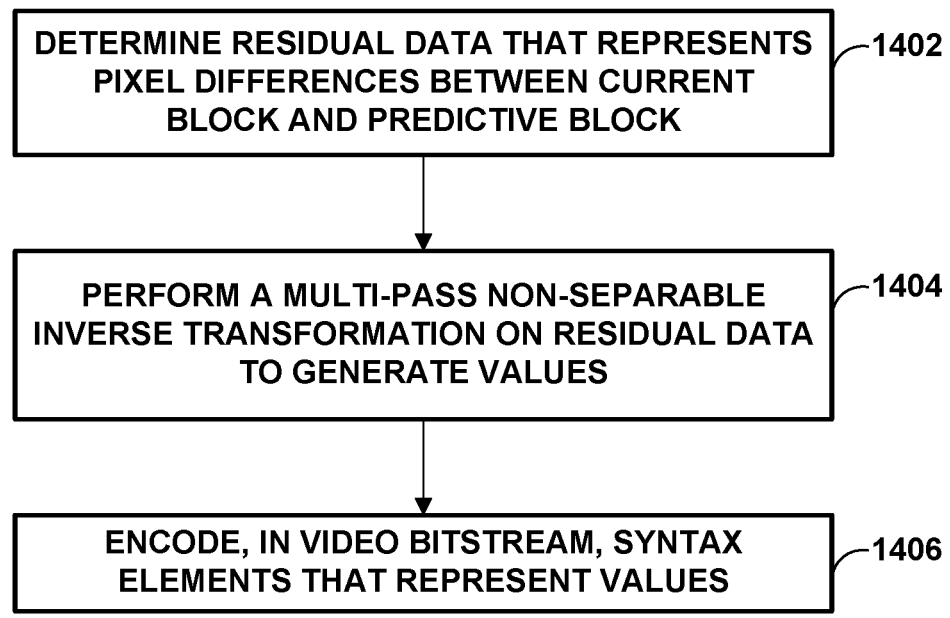
FIG. 14 is a flowchart illustrating an example process for encoding residual values of video data using Givens orthogonal transforms, in accordance with one or more techniques of this disclosure.

FIG. 14 is a flowchart illustrating an example process for encoding residual values of video data using Givens orthogonal transforms, in accordance with one or more techniques of this disclosure. The techniques of FIG. 14 may be performed by a video encoder, such as video encoder 22 illustrated in FIG. 1 and FIG. 12. For purposes of illustration, the techniques of FIG. 14 are described within the context of video encoder 22 of FIG. 1 and FIG. 12, although video encoders having configurations different than that of video encoder 22 may perform the techniques of FIG. 14.

Video encoder 22 may determine residual data that represents pixel differences between a current block of video data and a predictive block of video data (1402). For instance, residual generation unit 102 may determine the residual values for the current block. In some examples, video encoder 22 may determine the residual values for the current block by adding samples of a coding block to negative values of corresponding samples of the predictive block, or vice versa. In other examples, video encoder 22 may determine the residual values for the current block by subtracting samples of the predictive block from corresponding samples of the coding block, or vice versa. In some examples, the current block is a TU.

In accordance with one or more techniques of this disclosure, video encoder 22 may perform a multi-pass non-separable transformation on the residual data to generate a plurality of values (1404). For instance, entropy encoding unit 118 may obtain, for each respective pass of the multi-pass non-separable transformation, a respective plurality of pre-defined parameters that each represent a respective angle θ. Entropy encoding unit 118 may perform, based on a respective parameter of the plurality of pre-defined parameters for the respective pass, respective Givens orthogonal transformations on respective pairs of input values of a plurality of input values to generate respective pairs of output values of a plurality of output values wherein performing a respective pass of the multi-pass non-separable transformation comprises. In some examples, for a first pass of the multi-pass non-separable transformation, the plurality of input values used by entropy encoding unit 118 may be the residual data determined for the current block of the video data. In some examples, for subsequent passes pass of the multi-pass non-separable transformation, the plurality of input values used by entropy encoding unit 118 may be the plurality of output values generated for a most recent previous pass of the multi-pass non-separable transformation. For instance, the plurality of input values used by entropy encoding unit 118 for pass N of the multi-pass non-separable transformation may be the plurality of output values generated for pass N−1 of the multi-pass non-separable transformation.

In some examples, entropy encoding unit 118 may perform a plurality of rounds of the multi-pass non-separable transformation. For instance, entropy encoding unit 118 may obtain, for each respective pass of each respective round of the multi-pass non-separable transformation, a respective plurality of pre-defined parameters that each indicate a respective angle θ. To perform a respective pass of the multi-pass non-separable transformation, entropy encoding unit 118 may perform, based on a respective parameter of the plurality of pre-defined parameters for the respective pass, respective Givens orthogonal transformations on respective pairs of input values of a plurality of input values to generate respective pairs of output values of a plurality of output values. In some examples, the plurality of input values for a first pass of a first round of the multi-pass non-separable transformation may be the residual data determined for the current block of the video data. In some examples, the plurality of input values for a first pass of subsequent rounds of the multi-pass non-separable transformation may be the plurality of output values generated for a last pass of a most recent previous round of the multi-pass non-separable transformation. In some examples, the plurality of input values for subsequent passes of the multi-pass non-separable transformation comprise the plurality of output values generated for a most recent previous pass of the multi-pass non-separable transformation.

In some examples, entropy encoding unit 118 may perform a permutation pass on the output of the final pass of the final round. For instance, entropy encoding unit 118 may sort the values according to their variance.

In some examples, the number of passes performed by entropy encoding unit 118 is based on a size of the current block of video data. For instance, if the current block of video data is N×N, entropy encoding unit 118 may perform N passes. Where entropy encoding unit 118 performs multiple rounds, entropy encoding unit 118 may perform N passes for each round.

Video encoder 22 may encode, in a video bitstream, syntax elements that represent the generated values (1406). For example, video encoder 22 may quantize the generated values and generate one or more syntax elements that can be decoded to obtain the residual data. For instance, video encoder 22 may generate a syntax element indicating whether a data element is non-zero, a syntax element indicating a sign of the data element, a syntax element indicating whether the data element is greater than 1, a syntax element indicating whether the data element is greater than 2, and a syntax element indicating a remainder value for the data element. In the context of FIG. 14, quantization unit 106 may quantize the data elements and entropy encoding unit 118 may generate the one or more syntax elements. Video encoder 22 may entropy encode (e.g., CABAC encode) one or more of the syntax elements. In the context of FIG. 1, output interface 24 may output the bitstream.

Figure 15:
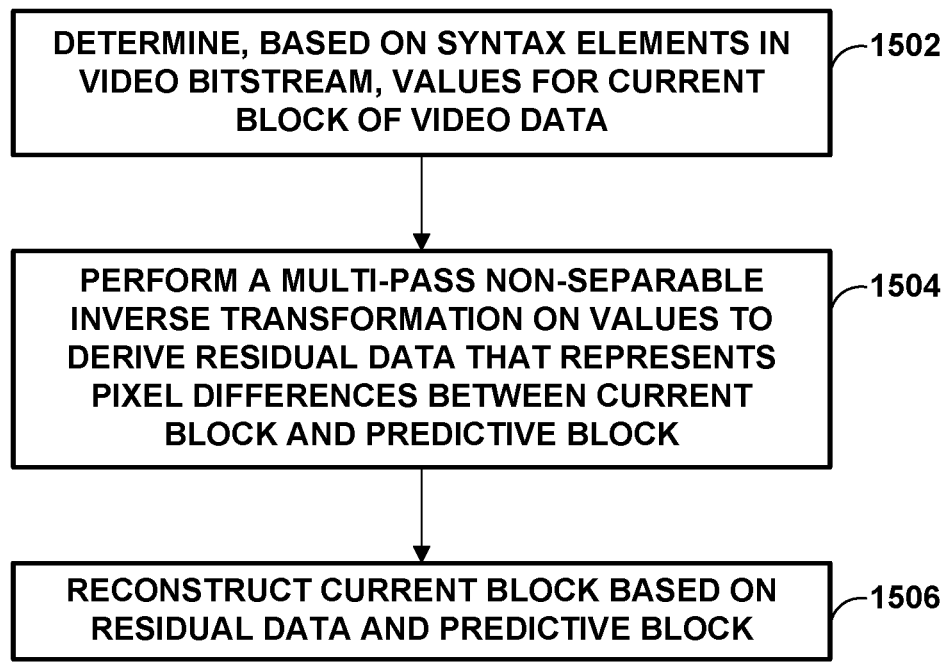
FIG. 15 is a flowchart illustrating an example process for decoding residual values of video data using Givens orthogonal transforms, in accordance with one or more techniques of this disclosure

FIG. 15 is a flowchart illustrating an example process for decoding residual values of video data using Givens orthogonal transforms, in accordance with one or more techniques of this disclosure. The techniques of FIG. 15 may be performed by a video decoder, such as video decoder 30 illustrated in FIG. 1 and FIG. 13. For purposes of illustration, the techniques of FIG. 15 are described within the context of video decoder 30 of FIG. 1 and FIG. 13, although video decoders having configurations different than that of video decoder 30 may perform the techniques of FIG. 15.

Video decoder 30 may determine, based on syntax elements in a video bitstream, values for a current block of video data (1502). Each of the values may be a respective transform coefficient. In some examples, input interface 26 may receive the bitstream. Furthermore, in some examples, video decoder 30 may parse the bitstream to obtain the syntax elements from the bitstream. In this example, video decoder 30 may perform entropy decoding (e.g., CABAC decoding) to determine values of the syntax elements. In some examples, video decoder 30 may obtain one or more syntax elements for a data element in the plurality of data elements, such as a syntax element indicating whether the data element is non-zero, a syntax element indicating a sign of the data element, a syntax element indicating whether the data element is greater than 1, a syntax element indicating whether the data element is greater than 2, and a syntax element indicating a remainder value for the data element. In the example of FIG. 13, entropy decoding unit 150 may obtain the syntax elements. Furthermore, in some examples, to determine the plurality of data elements, video decoder 30 may inverse quantize the data elements. In the context of FIG. 13, inverse quantization unit 154 may inverse quantize the data elements. In some examples, the current block is a TU.

Video decoder 30 may perform a multi-pass non-separable inverse transformation on values to derive residual data that represents pixel differences between the current block and a predictive block (1504). For instance, video decoder 30 may perform the multi-pass non-separable inverse transformation in a manner generally reciprocal to the multi-pass non-separable inverse transformation described above with reference to video encoder 22. For example, inverse transform processing unit 156 may obtain, for each respective pass of the multi-pass non-separable transformation, a respective plurality of pre-defined parameters that each represent a respective angle θ. Inverse transform processing unit 156 may perform, based on a respective parameter of the plurality of pre-defined parameters for the respective pass, respective Givens orthogonal transformations on respective pairs of input values of a plurality of input values to generate respective pairs of output values of a plurality of output values wherein performing a respective pass of the multi-pass non-separable transformation comprises. In some examples, the plurality of input values for a first pass of the multi-pass non-separable inverse transformation may be the plurality of values determined for the current block of the video data. In some examples, the plurality of input values for subsequent passes of the multi-pass non-separable inverse transformation may be the plurality of output values generated for a most recent previous pass of the multi-pass non-separable inverse transformation. For instance, the plurality of input values used by inverse transform processing unit 156 for pass N of the multi-pass non-separable transformation may be the plurality of output values generated for pass N−1 of the multi-pass non-separable transformation.

In some examples, inverse transform processing unit 156 may perform a plurality of rounds of the multi-pass non-separable transformation. For instance, entropy decoding unit 150 may obtain, for each respective pass of each respective round of the multi-pass non-separable transformation, a respective plurality of pre-defined parameters that each indicate an angle θ. To perform a respective pass of the multi-pass non-separable transformation, inverse transform processing unit 156 may perform, based on a respective parameter of the plurality of pre-defined parameters for the respective pass, respective Givens orthogonal transformations on respective pairs of input values of a plurality of input values to generate respective pairs of output values of a plurality of output values. In some examples, the plurality of input values for a first pass of a first round of the multi-pass non-separable inverse transformation may be the plurality of values determined for the current block of the video data. In some examples, the plurality of input values for a first pass of subsequent rounds of the multi-pass non-separable inverse transformation may be the plurality of output values generated for a last pass of a most recent previous round of the multi-pass non-separable inverse transformation. In some examples, the plurality of input values for subsequent passes of the multi-pass non-separable inverse transformation may be the plurality of output values generated for a most recent previous pass of the multi-pass non-separable inverse transformation.

In some examples, inverse transform processing unit 156 may perform a permutation pass on the output of the final pass of the final round. For instance, entropy decoding unit 150 may sort the residual data according to their variance.

In some examples, the number of passes performed by entropy decoding unit 150 may be based on a size of the current block of video data. For instance, if the current block of video data is N×N, inverse transform processing unit 156 may perform N passes. Where inverse transform processing unit 156 performs multiple rounds, inverse transform processing unit 156 may perform N passes for each round.

Video decoder 30 may reconstruct the current block based on the derived residual data and the predictive block (1506). For example, video decoder 30 may add samples of the residual data to corresponding samples of a predictive block to generate the samples of the current block. For instance, in the context of FIG. 13, prediction processing unit 152 may generate one or more predictive blocks and reconstruction unit 158 may add samples of the one or more predictive blocks to corresponding samples of the residual data to generate the samples of the current block. Reconstruction may be lossy, depending on the amount of quantization applied. Thus, the output of the transformation by video encoder 22 may not exactly match output of the inverse transformation performed by video decoder 30.

The following numbered examples may illustrate one or more aspects of the disclosure:

Example 1

A method of decoding video data, the method comprising: determining, by a video decoder and based on syntax elements in an encoded video bitstream, a plurality of values for a current block of the video data; performing, by the video decoder, a multi-pass non-separable inverse transformation on the plurality of values to derive residual data that represents pixel differences between the current block of the video data and a predictive block of the video data, wherein performing a pass of the multi-pass non-separable inverse transformation comprises performing a plurality of Givens orthogonal transformations; and reconstructing, by the video decoder, the current block of the video data based on the residual data and the predictive block of the video data.

Example 2

The method of example 1, further comprising: obtaining, for each respective pass of the multi-pass non-separable inverse transformation, a respective plurality of pre-defined parameters that each indicate a respective angle θ, wherein performing a respective pass of the multi-pass non-separable inverse transformation comprises: performing, based on a respective parameter of the plurality of pre-defined parameters for the respective pass, respective Givens orthogonal transformations on respective pairs of input values of a plurality of input values to generate respective pairs of output values of a plurality of output values, wherein the plurality of input values for a first pass of the multi-pass non-separable inverse transformation comprise the plurality of values determined for the current block of the video data, and wherein the plurality of input values for subsequent passes of the multi-pass non-separable inverse transformation comprise the plurality of output values generated for a most recent previous pass of the multi-pass non-separable inverse transformation.

Example 3

The method of example 2, wherein obtaining, for each respective pass of the multi-pass non-separable inverse transformation, the respective plurality of pre-defined parameters comprises: obtaining, for each respective pass of the multi-pass non-separable inverse transformation and based on a size of the current block of the video data, a respective plurality of pre-defined parameters that each indicate an angle θ.

Example 4

The method of any combination of examples 1-3, wherein permutations of input values that comprise the respective pairs of input values in each pass are fixed.

Example 5

The method of any combination of examples 1-3, wherein permutations of input values that comprise the respective pairs of input values in each pass are flexible.

Example 6

The method of any combination of examples 1-5, wherein performing the multi-pass non-separable inverse transformation on the plurality of values to derive the residual data comprises: performing multiple rounds of the multi-pass non-separable inverse transformation on the plurality of values to derive the residual data.

Example 7

The method of example 6, further comprising: obtaining, for each respective pass of each respective round of the multi-pass non-separable inverse transformation, a respective plurality of pre-defined parameters that each indicate a respective angle θ, wherein performing a respective pass of the multi-pass non-separable inverse transformation comprises: performing, based on a respective parameter of the plurality of pre-defined parameters for the respective pass, respective Givens orthogonal transformations on respective pairs of input values of a plurality of input values to generate respective pairs of output values of a plurality of output values, wherein the plurality of input values for a first pass of a first round of the multi-pass non-separable inverse transformation comprise the plurality of values determined for the current block of the video data, wherein the plurality of input values for a first pass of subsequent rounds of the multi-pass non-separable inverse transformation comprises the plurality of output values generated for a last pass of a most recent previous round of the multi-pass non-separable inverse transformation, and wherein the plurality of input values for subsequent passes of the multi-pass non-separable inverse transformation comprises the plurality of output values generated for a most recent previous pass of the multi-pass non-separable inverse transformation.

Example 8

The method of any combination of examples 1-7, further comprising: determining a number of passes included in the multi-pass non-separable inverse transformation based on a size of the current block of the video data.

Example 9

The method of any combination of examples 1-8, wherein the multi-pass non-separable transformation is not a matrix-based transformation.

Example 10

A method of encoding video data, the method comprising: determining, by a video encoder and for a current block of the video data, residual data that represents pixel differences between the current block of the video data and a predictive block of the video data; performing, by the video encoder, a multi-pass non-separable transformation on the residual data to generate a plurality of values, wherein performing a pass of the multi-pass non-separable inverse transformation comprises performing a plurality of Givens orthogonal transformations; and encoding, by the video encoder and in an encoded video bitstream, syntax elements that represent the plurality of values.

Example 11

The method of examples 10, further comprising: obtaining, for each respective pass of the multi-pass non-separable transformation, a respective plurality of pre-defined parameters that each indicate a respective angle θ, wherein performing a respective pass of the multi-pass non-separable transformation comprises: performing, based on a respective parameter of the plurality of pre-defined parameters for the respective pass, respective Givens orthogonal transformations on respective pairs of input values of a plurality of input values to generate respective pairs of output values of a plurality of output values, wherein the plurality of input values for a first pass of the multi-pass non-separable transformation comprise the residual data determined for the current block of the video data, and wherein the plurality of input values for subsequent passes of the multi-pass non-separable transformation comprise the plurality of output values generated for a most recent previous pass of the multi-pass non-separable transformation.

Example 12

The method of example 11, wherein obtaining, for each respective pass of the multi-pass non-separable transformation, the respective plurality of pre-defined parameters comprises: obtaining, for each respective pass of the multi-pass non-separable transformation and based on a size of the current block of the video data, a respective plurality of pre-defined parameters that each indicate an angle θ.

Example 13

The method of any combination of examples 10-12, wherein performing the multi-pass non-separable transformation on the residual data to derive the plurality of values comprises: performing multiple rounds of the multi-pass non-separable transformation based on the residual data to generate the plurality of values.

Example 14

The method of example 13, further comprising: obtaining, for each respective pass of each respective round of the multi-pass non-separable transformation, a respective plurality of pre-defined parameters that each indicate a respective angle θ, wherein performing a respective pass of the multi-pass non-separable transformation comprises: performing, based on a respective parameter of the plurality of pre-defined parameters for the respective pass, respective Givens orthogonal transformations on respective pairs of input values of a plurality of input values to generate respective pairs of output values of a plurality of output values, wherein the plurality of input values for a first pass of a first round of the multi-pass non-separable transformation comprise the residual data determined for the current block of the video data, wherein the plurality of input values for a first pass of subsequent rounds of the multi-pass non-separable transformation comprise the plurality of output values generated for a last pass of a most recent previous round of the multi-pass non-separable transformation, and wherein the plurality of input values for subsequent passes of the multi-pass non-separable transformation comprise the plurality of output values generated for a most recent previous pass of the multi-pass non-separable transformation.

Example 15

The method of any combination of examples 10-14, wherein obtaining, for each respective pass of the multi-pass non-separable transformation, the respective plurality of pre-defined parameters comprises: obtaining, for each respective pass of each respective round of the multi-pass non-separable transformation and based on a size of the current block of the video data, a respective plurality of pre-defined parameters that each indicate an angle θ

Example 16

The method of any combination of examples 10-15, wherein permutations of input values that comprise the respective pairs of input values in each pass are fixed.

Example 17

The method of any combination of examples 10-15, wherein permutations of input values that comprise the respective pairs of input values in each pass are flexible.

Example 18

The method of any combination of examples 10-17, further comprising: determining a number of passes included in the multi-pass non-separable transformation based on a size of the current block of the video data.

Example 19

A device for decoding video data, the device comprising: a memory configured to store the video data; and one or more processors configured to perform the method of any combination of examples 1-9.

Example 20

A device for encoding video data, the device comprising: a memory configured to store the video data; and one or more processors configured to perform the method of any combination of examples 10-18.

Example 21

A device for decoding video data, the device comprising: a memory configured to store the video data; and means for performing the method of any combination of examples 1-9.

Example 22

A device for encoding video data, the device comprising: a memory configured to store the video data; and means for performing the method of any combination of examples 10-18.

Example 23

A non-transitory computer-readable storage medium storing instructions that, when executed, cause one or more processors of a video decoder to perform the method of any combination of examples 1-9.

Example 24

A non-transitory computer-readable storage medium storing instructions that, when executed, cause one or more processors of a video encoder to perform the method of any combination of examples 10-18.

Example 25

A method comprising any combination of examples 1-18.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining, by a video decoder and based on syntax elements in an encoded video bitstream, a plurality of values for a current block of the video data;
    obtaining, by the video decoder, for each respective pass of a multi-pass non-separable inverse transformation, a respective plurality of pre-defined parameters that each indicate a respective angle θ;
    performing, by the video decoder, multiple rounds of the multi-pass non-separable inverse transformation on the plurality of values to derive residual data that represents pixel differences between the current block of the video data and a predictive block of the video data, wherein performing a respective pass of the multi-pass non-separable inverse transformation comprises:
        performing, based on a respective parameter of the plurality of pre-defined parameters for the respective pass, respective Givens orthogonal transformations on respective pairs of input values of a plurality of input values for the respective pass to generate respective pairs of output values of a plurality of output values,
        wherein the plurality of input values for a first pass of a first round of the multi-pass non-separable inverse transformation comprise the plurality of values determined for the current block of the video data,
        wherein the plurality of input values for a first pass of subsequent rounds of the multi-pass non-separable inverse transformation comprises the plurality of output values generated for a last pass of a most recent previous round of the multi-pass non-separable inverse transformation,
        wherein the plurality of input values for subsequent passes of the multi-pass non-separable inverse transformation comprises the plurality of output values generated for a most recent previous pass of the multi-pass non-separable inverse transformation, and
        wherein permutations of input values that comprise the respective pairs of input values in each pass are fixed such that, in a particular round, each input value touches each other input value exactly once;
    sorting, after performing of a last round of the multi-pass non-separable inverse transformation, the plurality of output values generated for a last pass of the last round to generate the residual data; and
    reconstructing, by the video decoder, the current block of the video data based on the residual data and the predictive block of the video data.

2. The method of claim 1, wherein obtaining the respective plurality of pre-defined parameters comprises:
    obtaining, based on a size of the current block of the video data, the respective plurality of pre-defined parameters that each indicate an angle θ.

3. The method of claim 1, further comprising:
    determining a number of passes included in the multi-pass non-separable inverse transformation based on a size of the current block of the video data.

4. The method of claim 1, wherein the multi-pass non-separable transformation is not a matrix-based transformation.

5. A method of encoding video data, the method comprising:
    determining, by a video encoder and for a current block of the video data, residual data that represents pixel differences between the current block of the video data and a predictive block of the video data;
    obtaining, for each respective pass of each respective round of the multi-pass non-separable transformation, a respective plurality of pre-defined parameters that each indicate a respective angle θ;
    performing, by the video encoder, multiple rounds of the multi-pass non-separable transformation on the residual data to generate a plurality of values, wherein performing a respective pass of the multi-pass non-separable transformation comprises:
        performing, based on a respective parameter of the plurality of pre-defined parameters for the respective pass, respective Givens orthogonal transformations on respective pairs of input values of a plurality of input values for the respective pass to generate respective pairs of output values of a plurality of output values, wherein the plurality of input values for a first pass of a first round of the multi-pass non-separable transformation comprise the residual data determined for the current block of the video data, wherein the plurality of input values for a first pass of subsequent rounds of the multi-pass non-separable transformation comprise the plurality of output values generated for a last pass of a most recent previous round of the multi-pass non-separable transformation, wherein the plurality of input values for subsequent passes of the multi-pass non-separable transformation comprise the plurality of output values generated for a most recent previous pass of the multi-pass non-separable transformation, and wherein permutations of input values that comprise the respective pairs of input values in each pass are fixed such that, in a particular round, each input value touches each other input value exactly once;

sorting, after performing of a last round of the multi-pass non-separable inverse transformation, the plurality of output values generated for a last pass of the last round to generate the plurality of values; and encoding, by the video encoder and in an encoded video bitstream, syntax elements that represent the plurality of values.

6. The method of claim 5, further comprising:

determining a number of passes included in the multi-pass non-separable transformation based on a size of the current block of the video data.

7. A device for decoding video data, the device comprising:

a memory configured to store the video data; and one or more processors, implemented in circuitry, configured to:

determine, based on syntax elements in an encoded video bitstream, a plurality of values for a current block of the video data;

obtain, for each respective pass of a multi-pass non-separable inverse transformation, a respective plurality of pre-defined parameters that each indicate a respective angle θ;

perform multiple rounds of the multi-pass non-separable inverse transformation on the plurality of values to derive residual data that represents pixel differences between the current block of the video data and a predictive block of the video data, wherein, to perform a respective pass of the multi-pass non-separable inverse transformation, the one or more processors are configured to:

perform, based on a respective parameter of the plurality of pre-defined parameters for the respective pass, respective Givens orthogonal transformations on respective pairs of input values of a plurality of input values to generate respective pairs of output values of a plurality of output values, wherein the plurality of input values for a first pass of a first round of the multi-pass non-separable inverse transformation comprise the plurality of values determined for the current block of the video data, wherein the plurality of input values for a first pass of subsequent rounds of the multi-pass non-separable inverse transformation comprises the plurality of output values generated for a last pass of a most recent previous round of the multi-pass non-separable inverse transformation, wherein the plurality of input values for subsequent passes of the multi-pass non-separable inverse transformation comprises the plurality of output values generated for a most recent previous pass of the multi-pass non-separable inverse transformation, and wherein permutations of input values that comprise the respective pairs of input values in each pass are fixed such that, in a particular round, each input value touches each other input value exactly once;

sort, after performing of a last round of the multi-pass non-separable inverse transformation, the plurality of output values generated for a last pass of the last round to generate the residual data; and reconstruct the current block of the video data based on the residual data and the predictive block of the video data.

8. The device of claim 7, wherein the one or more processors are further configured to:

determine a number of passes included in each round in the multi-pass non-separable inverse transformation based on a size of the current block of the video data, wherein each round includes a same number of passes.

9. A device for encoding video data, the device comprising:

memory configured to store the video data; and one or more processors, implemented in circuitry, configured to:

determine, for a current block of the video data, residual data that represents pixel differences between the current block of the video data and a predictive block of the video data;

obtain, for each respective pass of each respective round of the multi-pass non-separable transformation, a respective plurality of pre-defined parameters that each indicate a respective angle θ;

perform multiple rounds of the multi-pass non-separable transformation on the residual data to generate a plurality of values, wherein, to perform a respective pass of the multi-pass non-separable transformation, the one or more processors are configured to:

perform, based on a respective parameter of the plurality of pre-defined parameters for the respective pass, respective Givens orthogonal transformations on respective pairs of input values of a plurality of input values to generate respective pairs of output values of a plurality of output values, wherein the plurality of input values for a first pass of a first round of the multi-pass non-separable transformation comprise the residual data determined for the current block of the video data, wherein the plurality of input values for a first pass of subsequent rounds of the multi-pass non-separable transformation comprise the plurality of output values generated for a last pass of a most recent previous round of the multi-pass non-separable transformation, wherein the plurality of input values for subsequent passes of the multi-pass non-separable transformation comprise the plurality of output values generated for a most recent previous pass of the multi-pass non-separable transformation, and wherein permutations of input values that comprise the respective pairs of input values in each pass are fixed such that, in a particular round, each input value touches each other input value exactly once;

sort, after performing of a last round of the multi-pass non-separable inverse transformation, the plurality of output values generated for a last pass of the last round to generate the plurality of values; and encode, in an encoded video bitstream, syntax elements that represent the plurality of values.

10. The device of claim 9, wherein the memory is configured to store the pre-defined parameters, and wherein values of the pre-defined parameters are not included in the bitstream.

11. The method of claim 1, wherein obtaining the pre-defined parameters comprises:

obtaining, for each respective round of the multi-pass non-separable inverse transformation, a respective set of pre-defined parameters that each include a different plurality of pre-defined parameters that each indicate a respective angle $\theta$.

12. The method of claim 1, wherein the permutations of input values that comprise the respective pairs of input values in each pass are fixed such that, in a particular round, a Givens orthogonal transformation is performed on every permutation of input values exactly once.

13. The device of claim 7, wherein, to obtain the pre-defined parameters, the one or more processors are configured to:

obtain, for each respective round of the multi-pass non-separable inverse transformation, a respective set of pre-defined parameters that each include a different plurality of pre-defined parameters that each indicate a respective angle $\theta$.

14. The device of claim 7, wherein the permutations of input values that comprise the respective pairs of input values in each pass are fixed such that, in a particular round, a Givens orthogonal transformation is performed on every permutation of input values exactly once.

15. The method of claim 5, wherein obtaining the pre-defined parameters comprises:

obtaining, for each respective round of the multi-pass non-separable inverse transformation, a respective set of pre-defined parameters that each include a different plurality of pre-defined parameters that each indicate a respective angle $\theta$.

16. The method of claim 5, wherein the permutations of input values that comprise the respective pairs of input values in each pass are fixed such that, in a particular round, a Givens orthogonal transformation is performed on every permutation of input values exactly once.

17. The device of claim 7, wherein, to obtain the pre-defined parameters, the one or more processors are configured to:

obtain, for each respective round of the multi-pass non-separable inverse transformation, a respective set of pre-defined parameters that each include a different plurality of pre-defined parameters that each indicate a respective angle $\theta$.

18. The device of claim 7, wherein the permutations of input values that comprise the respective pairs of input values in each pass are fixed such that, in a particular round, a Givens orthogonal transformation is performed on every permutation of input values exactly once.

* * * * *